United States Patent
Matthews et al.

(10) Patent No.: US 8,560,511 B1
(45) Date of Patent: Oct. 15, 2013

(54) FINE-GRAIN LOCKING

(75) Inventors: Jacob Burton Matthews, Chicago, IL (US); Mayur Venktesh Deshpande, Long Beach, CA (US); Kasem Marifet, Costa Mesa, CA (US); James Lee Wogulis, Laguna Beach, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 13/239,261

(22) Filed: Sep. 21, 2011

Related U.S. Application Data

(60) Provisional application No. 61/510,052, filed on Jul. 20, 2011.

(51) Int. Cl.
*G06F 17/30* (2006.01)

(52) U.S. Cl.
USPC ............................................ 707/704

(58) Field of Classification Search
USPC ................................. 707/704, 803
See application file for complete search history.

(56) References Cited

U.S. PATENT DOCUMENTS

| | | | | |
|---|---|---|---|---|
| 5,301,290 | A * | 4/1994 | Tetzlaff et al. | 711/142 |
| 5,414,839 | A * | 5/1995 | Joshi | 1/1 |
| 6,108,654 | A * | 8/2000 | Chan et al. | 1/1 |
| 6,144,983 | A * | 11/2000 | Klots et al. | 718/104 |
| 6,606,626 | B1 * | 8/2003 | Ponnekanti | 1/1 |
| 8,060,880 | B2 * | 11/2011 | Cherem et al. | 718/102 |
| 8,307,101 | B1 | 11/2012 | Mui et al. | |
| 8,321,443 | B2 | 11/2012 | Andrade et al. | |
| 2003/0028631 | A1 | 2/2003 | Rhodes | |
| 2003/0105756 | A1 * | 6/2003 | Daynes | 707/8 |
| 2004/0122943 | A1 * | 6/2004 | Error et al. | 709/224 |
| 2007/0157157 | A1 * | 7/2007 | Dentzer et al. | 717/101 |
| 2010/0169894 | A1 * | 7/2010 | Sheaffer et al. | 718/106 |
| 2011/0131316 | A1 | 6/2011 | Ferris et al. | |
| 2011/0283045 | A1 * | 11/2011 | Krishnan et al. | 711/102 |
| 2012/0311153 | A1 | 12/2012 | Morgan | |

OTHER PUBLICATIONS

"The Web Doesn't Wait—Neither Should You," Chartbeat—Real-Time Website Analytics and Uptime Monitoring, Jul. 19, 2011, http://chartbeat.com.
"SiteCatalyst Product Overview", Adobe SiteCatalyst, Jul. 19, 2011, http://www.omniture.com/en/products/online_analystics/sitecatalyst.
"Your Dots, Connect," Webtrends, Analytics, Jul. 19, 2011, http://www.webtrends.com/Products/Analytics.
"Real Time Web Analytics," Web Analytics in Real Time/Clicky, Jul. 19, 2011, http://getclicky.com.

(Continued)

*Primary Examiner* — Cam-Linh Nguyen
(74) *Attorney, Agent, or Firm* — Foley and Lardner LLP; John D. Lanza

(57) ABSTRACT

Configurations for providing fine-grain locking of data structures for concurrent reading and writing into one or more data structures utilized by a real-time server. In one aspect, when an update is required to a portion of a data structure, the process enables locking of only that portion of the data structure to prevent other threads and/or processes from accessing the locked portion. Other threads or CPU processes can concurrently read and/or update non-locked portions of the data structure. Another aspect provides for determining whether an access to a portion of a data structure has occurred if the portion is locked and subsequently releasing the portion of the data structure if the access has occurred. In one aspect, the portion is release after a configurable predetermined period of time.

18 Claims, 13 Drawing Sheets

(56) References Cited

OTHER PUBLICATIONS

"Features Overview," Woopra, Jul. 19, 2011, http://www.woopra.com/features.

HIMEL, "Bulling Realtime Insights," Facebook Engineering's Notes, Jul. 19, 2011, https://www.facebook.com/note.php?note_id=10150103900258920.

"Real-Time Marketing, Simplified," Interaction Manager Overview, Toovio, Jul. 19, 2011, http://www.toovio.com/Interaction-Manager-Overview.

"Real-Time Event Tracking. Measure Actions, Not Page Views.," Mixpanel / Teal-Time Web Analytics, Funnel Analysis, Jul. 19, 2011, http://mixpanel.com.

* cited by examiner

Stage 1010
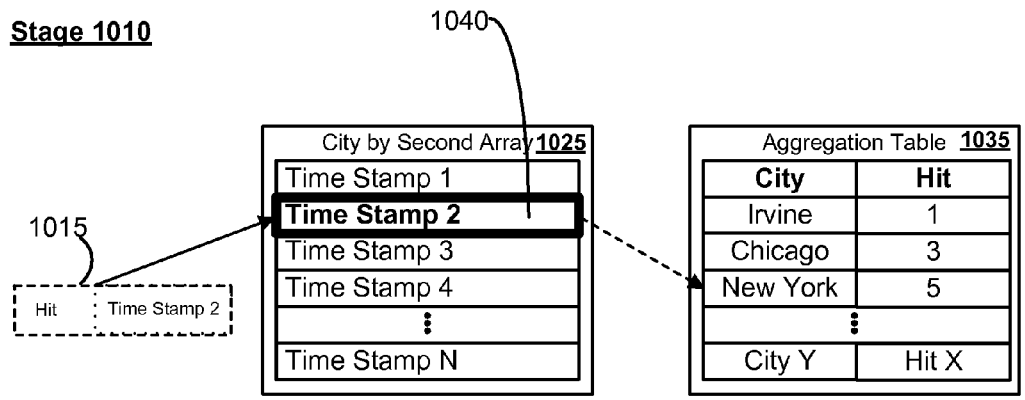
Stage 1020
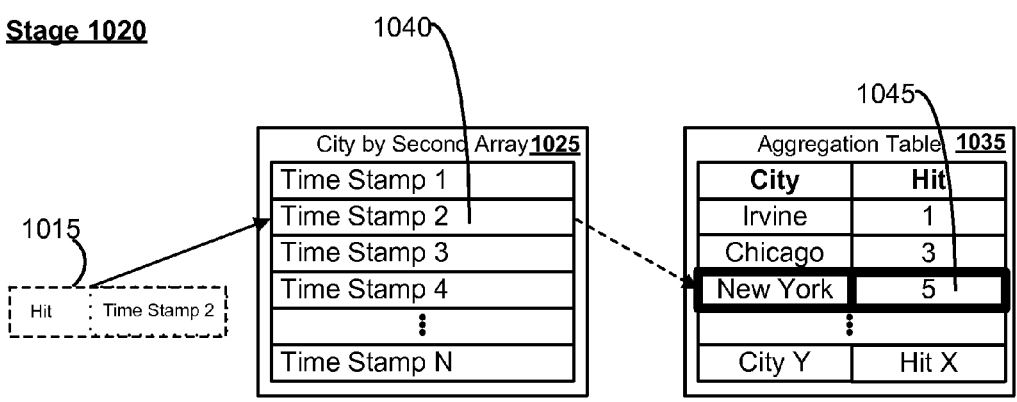
Stage 1030
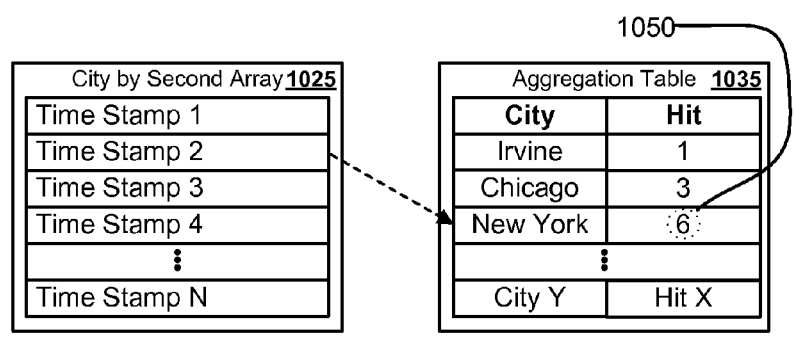
*Figure 10*

FINE-GRAIN LOCKING

CROSS-REFERENCE TO RELATED APPLICATIONS

The present application claims the benefit of priority under 35 U.S.C. §119 from U.S. Provisional Patent Application Ser. No. 61/510,052 entitled "REAL-TIME ANALYTICS SYSTEM," filed on Jul. 20, 2011, the disclosure of which is hereby incorporated by reference in its entirety for all purposes.

BACKGROUND

Web site analytics involves the analysis and reporting of web site traffic data to an associated publisher. A publisher is an entity that owns and/or manages a particular web site. The publisher can monitor web site analytics data related to user visits and links to the web site by using web site analytics tools provided by third parties.

Existing web site analytics data systems work well for processing a high volume of web traffic data in order to provide interactive reports over substantial periods of time with high fidelity. However, these systems incur a high level of latency from hit occurrence to hit reporting, and also do not allow reports to segment in a fine and granular time basis. Consequently, existing web site analytics data systems have difficulty in monitoring sudden spikes or drops in traffic, or for tracking, for example, a propagation of a link to the publisher's web site over a social networking site, which can typically unfold in a time period of minutes.

Furthermore, the high latency of web site analytics reporting makes it more difficult for publishers to implement web site analytics on their web sites. Because it takes a longer period of time for reports to show up, publishers also often fail to notice any erroneous deployment of web site analytics tracking code on associated web sites.

SUMMARY

The subject technology provides determining whether a portion of a data structure is available for updating with event tracking data based on a time stamp of the event tracking data in which the event tracking data tracks an activity associated with a source of the event tracking data. The portion of the data structure is locked to prevent access by other processes to the portion if it is determined that the portion of the data structure is available. The portion of the data structure is then updated with the event tracking data.

Another aspect of the subject technology provides for determining whether an access to a portion of a data structure has occurred if the portion is locked. The portion of the data structure is then released if the access has occurred.

The subject technology further provides a system for providing fine-grain locking of a data structure to prevent access to a portion of the data structure utilized for real-time analytics reporting. The system includes a buffer module configured to queue and transmit event tracking data included in one or more event tracking data communications. Each event tracking data communication includes event tracking data for tracking an activity associated with a source of the event tracking data communication, and the event tracking data includes respective characteristics in a set of categories. The system also includes a real-time analytics query engine configured to lock a respective portion of one or more aggregation tables and to update the one or more aggregation tables with the event tracking data. Each aggregation table includes event tracking data organized by a subset of the categories. Additionally, the system includes a real-time analytics data storage module configured to store the updated one or more aggregation tables from the real-time analytics query engine.

The subject technology also provides for determining whether a portion of a table data structure is available for updating with event tracking data based on a time stamp of the event tracking data in which the table data structure includes a set of respective rows. The event tracking data tracks an activity associated with a source of the event tracking data. The portion of the table data structure is locked to prevent access by other processes to the portion if the portion of the table data structure is available in which the portion of the table data structure includes a respective row in the table data structure. The portion of the table data structure is updated with the event tracking data. The portion of the table data structure is then released after updating the portion with the event tracking data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

FIG. 10 conceptually illustrates an exemplary data structure in different stages in which a process for fine-grain locking a portion of the data structure can access of some configurations.

DETAILED DESCRIPTION

Figure 1:
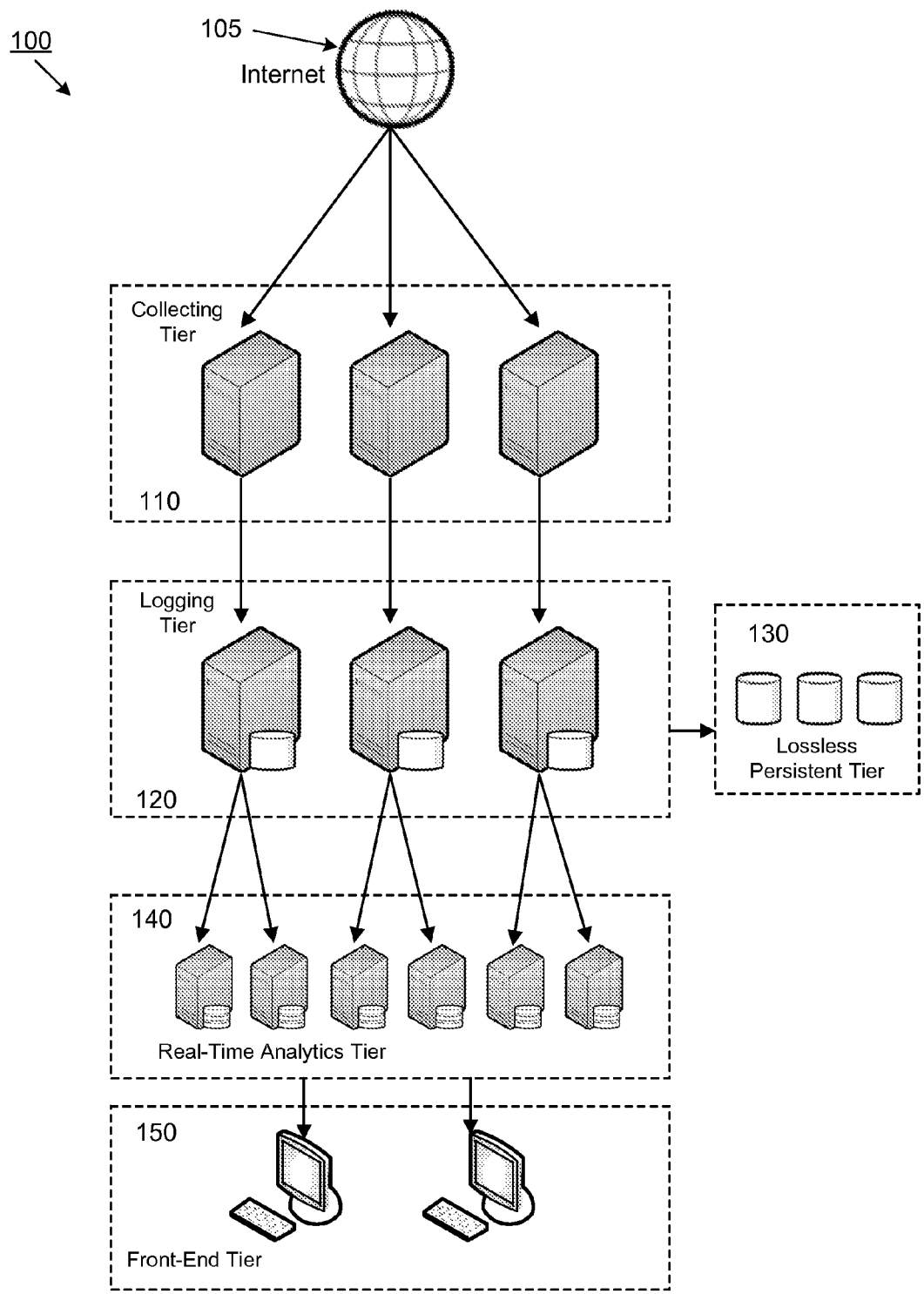
FIG. 1 illustrates an exemplary architecture diagram of a multi-tiered real-time analytics system of some configurations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Current analytics systems provide for aggregating and reporting of web site traffic data with high latency that can range from several hours to over a day. To address issues with high latency, a real-time analytics system for receiving and reporting web site traffic data with low latency is provided. More specifically, the real-time analytics system aggregates and reports web site traffic data by creating and maintaining multiple aggregation tables. These multiple aggregation tables can be concurrently read and written to by multiple processes (e.g., different instances of applications and/or servers). To maintain the integrity of the aggregation tables, a system typically locks access to an entire data structure such as an aggregation table while a current process is accessing that data structure. However, locking the entire data structure introduces unacceptable latency into a real-time analytics system because other processes are required to wait (i.e., unable to access) until the data structure is released (e.g., after the current process has finished accessing). Thus, the execution of multiple processes can be impeded by denying access to the data structure in the real-time analytics system. A solution for allowing concurrent access of a particular data structure (e.g., an aggregation table) without introducing unnecessary latency is therefore desired.

The subject technology is directed to providing a fine-grain locking process for concurrent reading and writing into data structures utilized by a real-time server. When an update is required to a portion of a data structure, the process enables locking of only that portion of the data structure to prevent other threads and processes from accessing the locked portion. Other threads or CPU processes can concurrently read and/or update non-locked portions of the data structure. In this manner, latency in the system is minimized for accessing the data structure.

By way of example, a real-time server utilizes the fine-grain locking process to lock a portion of a particular data structure(s), such as an array and/or aggregation table, that requires an update. For instance, in some implementations, the real time server can determine whether web site tracking data stored in an array structure requires an update by comparing an associated time stamp of the tracking data with the current time stamp stored in the array. If the time stamps do not match, then the stored tracking data is considered too old and is updated with the current web site tracking data. In this case, the real-time server locks the portion of the array and/or aggregation table that requires updating with the current web site tracking data. Although, the above description discloses that the array structure contains web site tracking data, as further described in detail below, other types of data such as event tracking data can be included in the array structure and still be within the scope of the subject technology.

To use a web site analytics data system, a publisher typically provides tracking instructions embedded in the web site's web pages (alternatively or conjunctively, by providing code in its web page that requests the tracking instructions from an analytics server). Typically, the tracking instructions are a small region of JavaScript™ code that the publisher includes in each page of the publisher's web site for which traffic is to be tracked. When a web page is rendered by a user device and/or client (e.g., web browsers, mobile devices, tablet devices, thin clients, thick clients, etc.), the tracking instructions are executed, which collects visitor data related to one or more different user sessions and sends it back to a real-time analytics server in the form of an event tracking data communication for processing. One method of sending the event tracking data communication is to send it as part of a Hypertext Transfer Protocol (HTTP) request.

Web site traffic data can be in the form of the aforementioned event tracking data communications (e.g., Hypertext Transfer Protocol (HTTP) requests that are generated from various user devices and/or clients). Each event tracking data communication can be triggered upon loading of a web page or resource (e.g., image file, banner ad, audio file, etc.) on the web site by a particular visitor to a publisher's web site. For the purpose of web site analytics reporting, the associated event tracking data (e.g., included in associated HTTP requests) can include a web property ID (e.g., an account identifier that identifies a publisher's analytics account of a particular web site), visitor identity data (i.e., corresponding to a particular user session), an event statistic(s) (such as a timestamp of the current web page communication), and user data such as location data (i.e., geographical information) associated with the visitor to the publisher's web site. The amount and types of events/information that are reported in the tracking data can be specified by the publisher (e.g., to account for particular information that a publisher wishes to track as web site analytics data).

Although an event tracking data communication is described as including web site traffic data, an event tracking data communication is not limited to including web site traffic data. In particular, an event tracking data communication can include data from any source (e.g., application, platform, etc.) that for tracking an activity associated with the source. For example, in a mobile application platform, an event tracking data communication can include event tracking data that tracks an event associated with an activity within the mobile application platform. In this example, the event tracking data associated with the mobile application platform may not include web site traffic data because the mobile application platform does not require the use of a client such as a web browser. Aspects of the multi-tiered real-time analytics system therefore can be configured to receive and process an event tracking data communication(s) including different forms of event tracking data that are outside the scope of web site tracking data.

A multi-tiered real-time analytics system as described herein can be configured to receive and process incoming event tracking data communications as described above to enable real-time reporting of web site analytics data with low latency. As used herein, the term "real-time" corresponds with reporting web site analytics data within a specified deadline by pushing/transmitting the web site analytics data through different tiers of the multi-tiered real-time analytics system. The expression "low latency" as used herein can be therefore understood as a measurement of time that covers a time period from the reception of an event tracking data communication to the real-time reporting of the web site analytics data included therein. As illustrated in FIG. 1 and described in further detail below, the flow of event tracking data goes through several tiers for real-time web site analytics processing and reporting.

A real-time system is subject to a "real-time constraint" that can impose operational deadlines from an event to a system response. Thus, a real-time system operates within constraints on response time. In the context of the multi-tiered real-time analytics system, the flow of event tracking data through different tiers of the system is required to meet deadlines in order to report the data within a specified period of time (e.g., in a real-time manner with low latency). In one example, the real-time analytics system imposes a respective one second deadline for processing event tracking data within each tier of the system. For instance, upon receipt of an event tracking data communication, a logging server (e.g., in a logging tier described further below) must forward the event tracking data communication within a one second deadline to a real-time server (e.g., in a real-time analytics tier described below). In the event that the logging server can not meet the one second deadline, the event tracking data communication is dropped (e.g., discarded) by the logging server and no further processing occurs for that event tracking data communication. Similarly, when the real-time server receives the event tracking data communication from the logging server, the real-time server must forward the event tracking data communication to another real-time server or a front-end server (as described below) within a one second deadline. The real-time server similarly discards the event tracking data communication if it can not meet the one second deadline. The one second deadline discussed above is just one example of the specified period of time. Other periods of time may be specified. In addition, each tier of the real-time analytics system may have a different specified period of time for processing an event tracking data communication.

FIG. 1 illustrates an exemplary architecture diagram of a multi-tiered real-time analytics system 100 for receiving and reporting web site traffic data in the form of event tracking data communications. The multi-tiered real-time analytics system 100 receives such event tracking data communications from a network 105 and routes the received communications for persistent and temporary storage to enable web analytics processing by the system. The network 105 can include, but is not limited to, a local network, remote network, or an interconnected network of networks (e.g., Internet as shown in FIG. 1).

As illustrated, the multi-tiered real-time analytics system 100 may further include a collecting tier 110, a logging tier 120, a persistent tier 130, a real-time analytics tier 140 and a front-end tier 150. Each of the aforementioned tiers can include a respective cluster of servers/computers that perform a same set of functions in a distributed and/or load balanced manner. A cluster can be understood as a group of servers/computers that are linked together to seamlessly perform the same set of functions, which can provide performance, reliability and availability advantages over a single server/computer architecture. For the sake of simplicity, each illustrated tier depicts several number of servers. However, one of ordinary skill in the art would realize that the illustrated tiers could include any number of servers and still be within the scope of the subject technology. The descriptions of the various tiers of the system 100 are explained in further detail below.

In some configurations, the collecting tier 110 receives incoming event tracking data communications from the network 105. The collecting tier 110 includes at least one collecting server that is configured to receive and forward the event tracking data communication. Each collecting server of the collecting tier 110 can process an incoming event tracking data communication to determine a particular server in the logging tier 120 to route the event tracking data communication. In some implementations, the collecting server can utilize a load balancing technique to determine which logging server in the logging tier 120 to route the event tracking data communication. The load balancing technique can be based upon different factors such as server load, network load, and/or any other suitable computing metric for measuring resource utilization at a particular server.

The logging tier 120 can receive a routed event tracking data communication from a particular collecting server of the collecting tier 110. Upon receiving the event tracking data communication, the subsequent tasks of the logging tier 120 can be understood as being two-fold: 1) route received event tracking data communications to the persistent tier 130 for persistent storage and 2) route received event tracking data communication to the real-time analytics tier 140 for temporary storage.

To accomplish the aforementioned tasks, the logging tier 120 includes at least one logging server that is configured to receive the routed event tracking data communication from the collecting server. In some implementations, the logging server aggregates incoming event tracking data communications and then periodically routes the aggregated event tracking data communications to the persistent tier 130 for persistent storage. Each event tracking data communication is associated with a particular web site of a publisher and the aggregated event tracking data communications can originate from disparate associated web sites and/or the same web site. In some implementations, the logging server can be further configured to verify each routed event tracking data communication to guarantee delivery of the event tracking data communications to a particular long-term storage server in the persistent tier 130.

For persistent storage of the event tracking data communication, the persistent tier 130 of some configurations can include at least one long-term storage server. Each long-term storage server includes a non-volatile storage device(s), a database(s), or other similar non-volatile storage medium for persistent storage of an incoming event tracking data communication. Persistent storage as used herein can be understood as referring to a type of non-volatile storage that stores the event tracking data in a reliable manner. In some configurations, persistent storage can include lossless or near-lossless storage in which the data is stored without being deleted and/or replaced at a subsequent time period. Additionally, persistent storage can be characterized as storing event tracking data in a form of historical records so that the system can extract the stored tracking data at a later period of time. In some configurations, the stored event tracking data can be modified at a later time period. Alternatively, the stored event tracking data can be in the form of immutable records (i.e., data that is not modified after being stored).

To improve the reliability of the persistent storage, some implementations of the persistent tier 130 can replicate the stored event tracking data across another long-term storage server so that the tracking data is mirrored in at least one other long-term storage server. For instance, the long-term storage server that receives a particular event tracking data communication can then undergo a replication process (either initiated by the long-term storage server itself, a second long-term storage server, or another server in the multi-tiered system) to copy (i.e., replicate) the particular event tracking data to another long-term storage server. Data redundancy can therefore can be provided to enable fault tolerance in the event the data stored at one long-term storage server is corrupted and/or lost.

To meet the low latency requirements for a multi-tiered real-time analytics system, the system can employ a lossy scheme for reporting web site traffic data in which some loss of event tracking data is tolerated. In particular, because the event tracking data is stored in persistent storage as described above, the multi-tiered real-time analytics system can adopt certain trade-offs for the sake of minimizing latency when routing the event tracking data to the real-time analytics tier as described further below.

Each logging server of the logging tier 120 is further configured to route event tracking data communications to the real-time analytics tier 140 for temporary storage. Given the requirement of low latency (i.e., minimizing latency in the system) connected with reporting real-time analytics data, each logging server can be configured to route the event tracking data communications to the real-time analytics tier 140 at a greater frequency than routing the communications to the persistent tier 130. In some implementations, routing the tracking data communications to the real-time analytics tier 140 can be understood as occurring asynchronously with routing the communications to the persistent tier 130.

The real-time analytics tier 140 includes at least one real-time server that is configured to receive the routed event tracking data communication from the logging tier 120. The real-time server in some implementations is configured to aggregate and/or sort the event tracking data according to one or more predetermined criteria for real-time reporting of the web site analytics data to a publisher. As described before, each event tracking data communication can include visitor identity data corresponding to a user session, location data associated with the user/visitor, and a timestamp corresponding to the visitor action.

The real-time server of some implementations can process the aforementioned data to generate real-time analytics data for temporary storage. For instance, the real-time server can aggregate and sort the location data according to the timestamp of the visitor action and then temporarily store the aggregated and/or sorted real-time analytics data. One of ordinary skill in the art would appreciate that other criteria can be used for aggregating and sorting the real-time analytics data. In one aspect, the real-time server sends the aggregated and/or sorted real-time analytics data to the front-end tier 150 for reporting the real-time analytics data. Moreover, as used herein, temporary storage can be understood as providing volatile, quick access to data (in comparison to persistent storage) stored in a storage device such as volatile memory (e.g., random access memory).

Alternatively to the above, the front-end tier 150 in one aspect can run queries on the stored real-time analytics data to report to the publisher with low latency. For instance, the real-time server can be configured to process incoming queries from the front-end tier on the stored real-time analytics data. The real-time server can return matching real-time analytics data based on the queries to the front-end tier 150 for real-time presentation with low latency.

In some implementations, the system 100 includes the front-end tier 150, which includes at least one front-end server configured to report the real-time analytics data with low latency. As described above, the front-end server of some implementations is configured to receive real-time analytics data from the real-time server. By way of example, the front-end server can receive real-time web analytics data associated with a particular location (e.g., city, state, country, etc.) over a predetermined time period for presentation at a front-end interface (i.e., graphical user interface) to an end-user. One of ordinary skill in the art would understand that any set of real-time analytics data could be received for reporting the analytics data in a real-time manner.

Although the above description provides that system 100 includes several tiers, one of ordinary skill in the art would appreciate that in some configurations respective tiers could be combined to function as a single tier and still be within the scope of the subject technology. For instance, the above described collecting and logging tiers could be implemented as a single tier that perform a combined set of functions.

Moreover, to facilitate communication between the respective tiers as described above, the respective tiers can be configured to communication over a type of network, such as a local area network, a wide area network, or an interconnected network of networks (e.g., the Internet) and by using any sort of network/communications protocol (Transmission Control Protocol and Internet Protocol (TCP/IP), HTTP, etc.).

In addition, different configurations of the multi-tiered system can be organized in different ways. For instance, different tiers could be located in different geographical locations. Each geographical location can be associated with a respective data center that includes one or more servers associated with a particular tier. Alternatively or conjunctively, the respective servers in one particular tier could be located in one or more different geographical locations and/or data centers. This flexibility in organizing the multi-tiered system provides an advantage of increasing the scalability of the system to include servers across potentially disparate physical locations.

In the following section, respective exemplary processes for routing an event tracking data communication to a real-time server and processing the tracking data communication by the real-time server are described in further detail.

Figure 2:
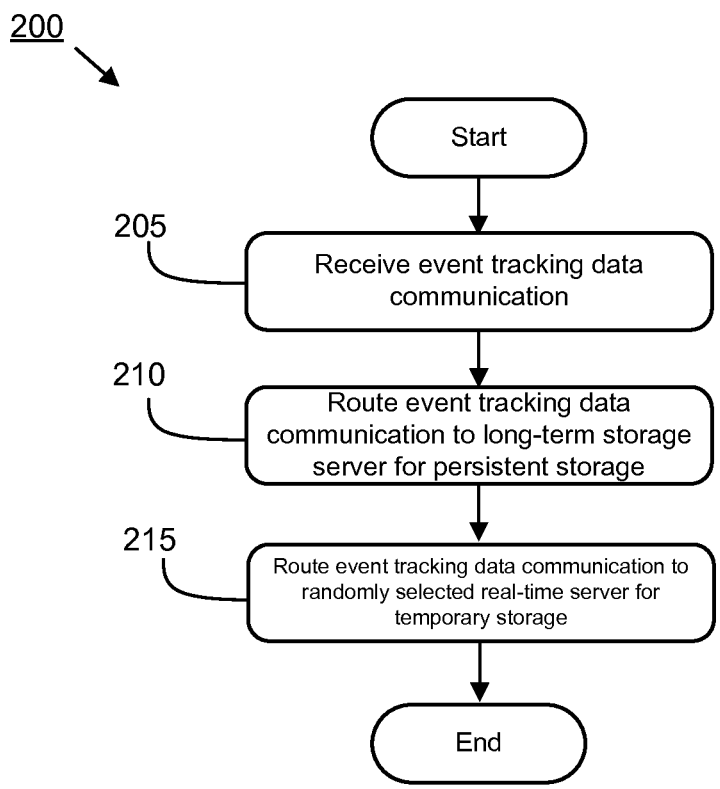
FIG. 2 conceptually illustrates an exemplary process for routing an event tracking data communication for persistent and temporary storage of some configurations.

FIG. 2 conceptually illustrates an exemplary process 200 for routing an event tracking data communication for persistent and temporary storage of some configurations. More specifically, FIG. 2 illustrates the process performed by a logging server to route event tracking data communications to a persistent tier and to a real-time analytics tier. The process 200 of FIG. 2 will be described by reference to corresponding portions of FIG. 1.

The process 200 starts when an event tracking data communication is received at 205. By reference to FIG. 1, the logging server in the logging tier 120 receives the event tracking data communication from a collecting server in the collecting tier 110. In some implementations, the logging server can receive the web site communication when pushed from the collecting server. For example, instead of the logging server utilizing a client pull technique to request an event tracking data communication, the tracking data communication is pushed as a server push from the collecting server to the logging server. Hence, the latency of receiving the event tracking data communication is decreased because the aforementioned data flow reduces the typical overhead associated with a traditional request/response communication flow.

The process 200 can then perform the task of routing the received web site to separate tiers. At 210, the event tracking data communication is routed to a long-term storage server (e.g., in the persistent tier 130 from FIG. 1) for persistent storage. Referring to FIG. 1, the logging server in the logging tier 120 routes the event tracking data communication to the long-term storage server in persistent tier 130. In some implementations, the logging server can queue several received event tracking data communications for routing the tracking data communications in a batch manner. When the logging server performs the steps in the process 200, some implementations can further verify the delivery of the event tracking data communication to the long-term storage server in order to guarantee the delivery of the communication.

The process 200 then continues to 215 to route the event tracking data communication to a selected real-time server. Referring to FIG. 1, the real-time analytics tier 140 can include several real-time servers. The logging server in the logging tier 130 can arbitrarily select a real-time server to route the event tracking data communication. By performing an arbitrary selection of the real-time server, latency in reporting real-time analytics data can be decreased because the process 200 does not rely on any particular real-time server to process the tracking data communication. The arbitrary selection of the real-time server by the process 200 also alleviates potential processing bottlenecks by impartially distributing the event tracking data communications across the real-time servers in the real-time analytics tier 140 from FIG. 1. In some configurations, the real-time server can be selected based on different criteria. For example, the logging server can select the real-time server using a randomized selection in which a particular real-time server is randomly selected from among more than one different real-time servers. In yet other configurations, the logging server can select the real-time server based on load-balancing requirements in which one or more particular computing metrics are utilized to determine the real-time server to receive the event tracking data communication.

Additionally, the process 200 at 215 can route the event tracking data communication at a greater frequency than routing the communication to the long-term storage server. For example, when the logging server receives the event tracking data communication, the logging server can queue several tracking data communications before sending them to the long-term storage server because low latency is not a factor for the aspect of the multi-tiered system dealing with persistent storage of the event tracking data. In one aspect, the logging server can immediately or in a shorter time period route the event tracking data communication to the randomly selected real-time analytics server to ensure that the requirement of low latency processing, storing and reporting of the real-time analytics data is met. After routing the event tracking data communication to the long-term storage server and the real-time server, the process 200 then ends.

Although the above description of the process 200 describes that routing to the long-term storage server occurs before routing to the real-time server, one of ordinary skill in the art can appreciate that the described order is one exemplar and some implementations could reverse the order of the previously described routing without departing from the scope of the invention. For instance, some implementations could route the event tracking data communication to the real-time server before routing the communication to the long-term storage server. In another aspect, routing the communication to the long-term storage server and the real-time server occurs in a simultaneous and/or synchronous manner.

Figure 3:
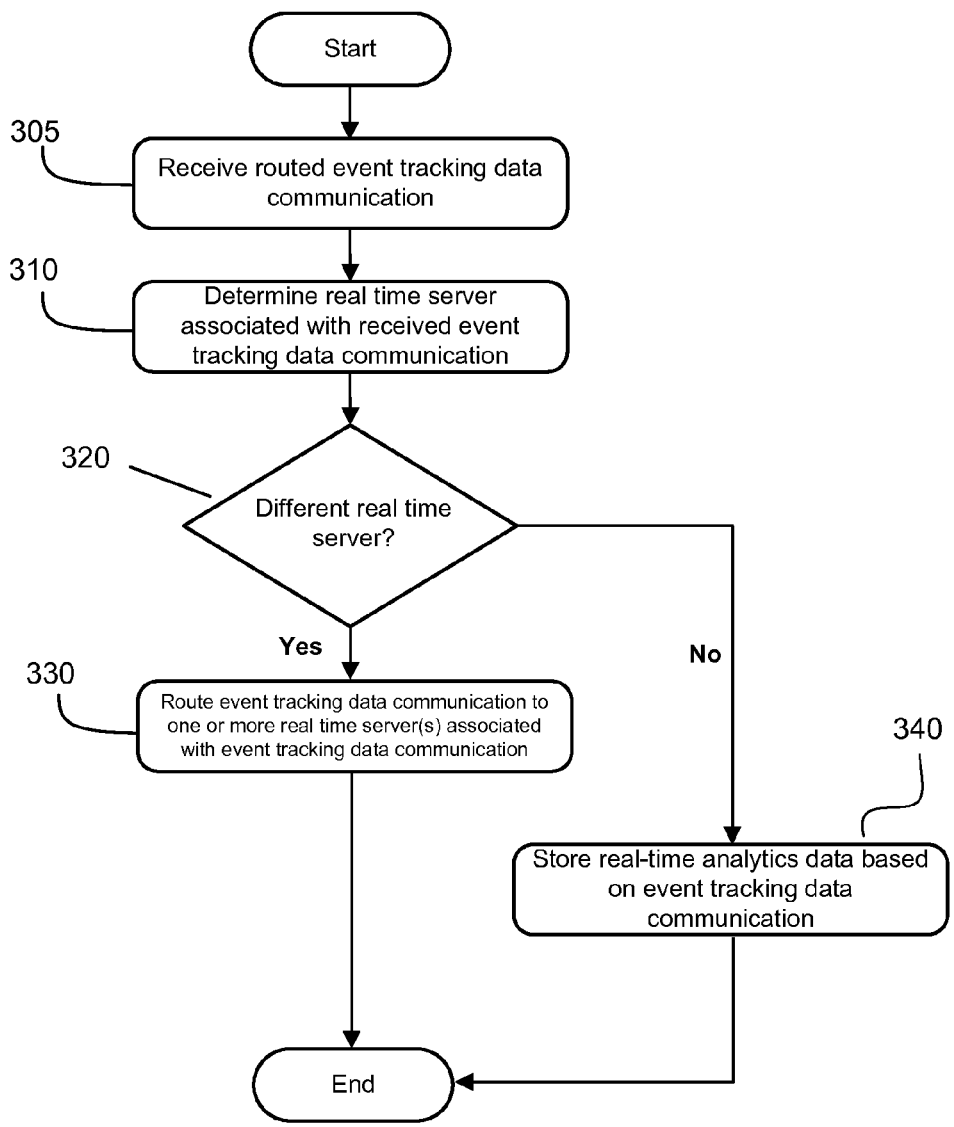
FIG. 3 conceptually illustrates an exemplary process for processing an event tracking data communication in a real-time server of some configurations.

The following discussion describes an exemplary process for processing and storing an event tracking data communication received by an arbitrarily selected real-time server. In some configurations, after the event tracking data communication is routed to the arbitrarily selected real-time server as described above in FIG. 2, the process illustrated in FIG. 3 is performed by the real-time server. More specifically, FIG. 3 conceptually illustrates an exemplary process 300 for processing an event tracking data communication in a real-time server.

The process 300 begins when a routed event tracking data communication is received at 305 in a selected real-time server. For instance, the real-time server can receive the event tracking data communication when the communication is pushed from the logging server to the real-time server. As similarly discussed above in connection with FIG. 2, the logging server can employ a push technique to push event tracking data communications to the arbitrarily selected real-time server. In other words, by pushing the event tracking data communication, the logging server initiates a communication flow without requiring an initial request from the recipient (i.e., the arbitrarily selected real-time server). Thus, an associated overhead of a typical request/request communication flow can be eliminated in the multi-tiered system. As a result, latency is reduced in the system for processing and reporting real-time analytics data.

At 310, the process 300 determines the real-time server(s) associated with the event tracking data communication. In some implementations, a real-time server(s) can be associated with a web site of a particular publisher. For instance, the real-time server can consult a table, list or other suitable data structure that indicates one or more real-time servers that are associated with the publisher's web site. The associated one or more real-time servers therefore can be considered an "owner" of any event tracking data communication for that publisher's web site. In practical terms, when acting as the owner, the associated real-time server is required to process each event tracking data communication for that publisher's web site. Based on the determination at 310, the process 300 can decide at 320 whether a different real-time server is associated with the received event tracking data communication.

In an instance in which the process 300 determines at 320 that the real-time server is not associated with the event tracking data communication, the process 300 continues to 330. At 330, the process 300 routes the event tracking data communication to one or more real-time servers associated with the event tracking data communication based on the determination at 310. Referring to FIG. 1, the real-time server can route the event tracking data communication to the associated one or more real-time servers in the real-time analytics tier 140. The process 300 then ends.

Alternatively, in an instance in which the process 300 determines at 320 that the real-time server is associated with the event tracking data communication, the process 300 continues to 340 to temporarily store real-time analytics data based on the event tracking data communication. A more detailed description of exemplars of the real-time analytics data will be discussed below in connection with FIG. 4 below. In some implementations, the process 300 temporarily stores the real-time analytics data in non-persistent storage (e.g., volatile memory, RAM, etc.). After storing the event tracking data communication, the process 300 then ends.

Although the above description describes that the process 300 determines an associated owner of the event tracking data communication at 320, one of ordinary skill in the art can appreciate that in some implementations this step is not performed (i.e., process 300 foregoes 310-330) and the process 300 immediately proceeds to 340 to store the event tracking data communication. In such implementations, the real-time server that receives the communication assumes ownership of the received communication.

The following description describes an exemplary process for segmenting and ranking incoming event tracking data communications according to a predetermined query. To organize the web site tracking data into a contextually meaningful format for reporting the real-time analytics data with low latency, the exemplary process can segment the event tracking data communication into one or more aggregation tables.

Figure 4:
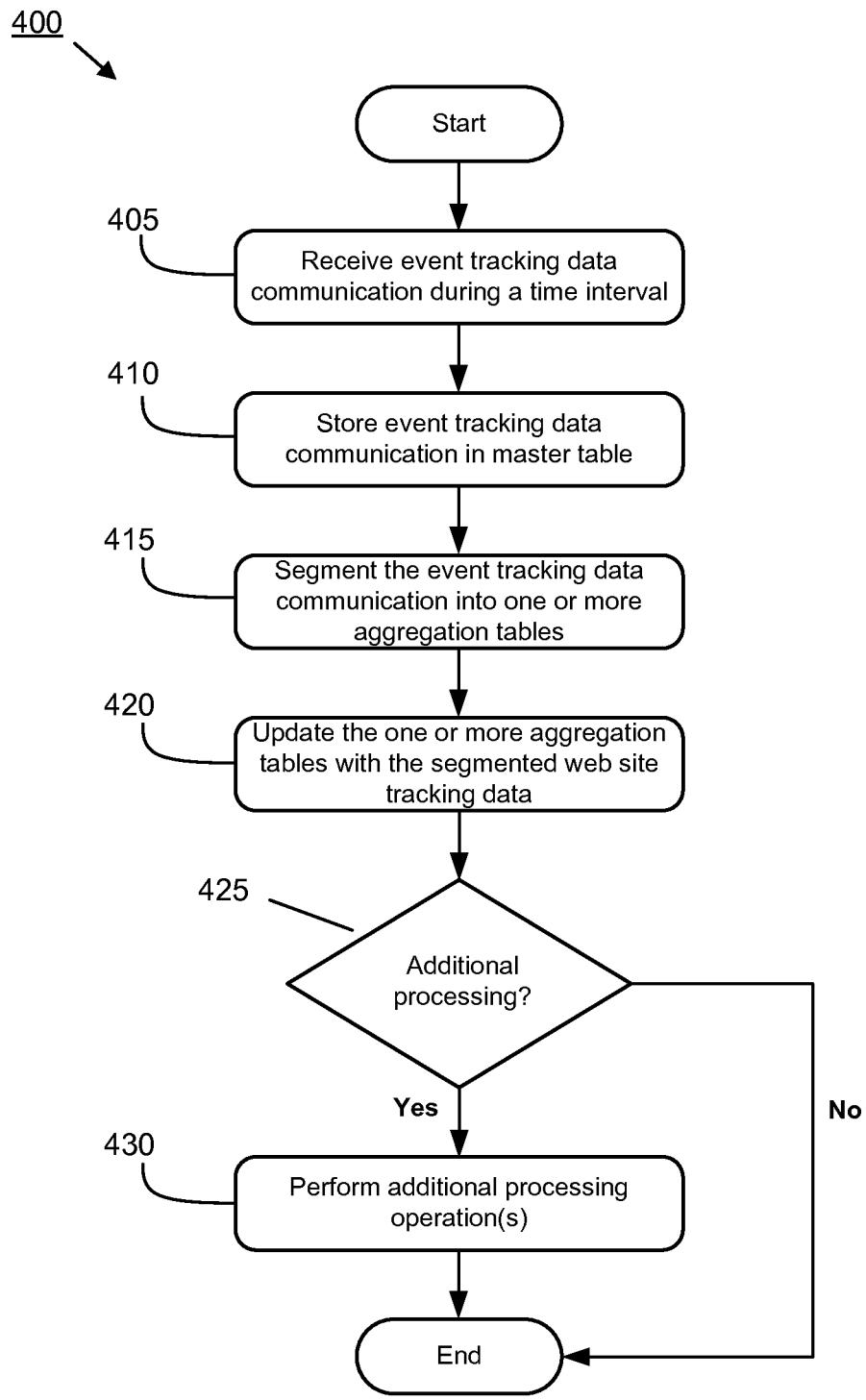
FIG. 4 conceptually illustrates an exemplary process for segmenting and ranking web site tracking data for real-time analytics reporting of some configurations.

FIG. 4 conceptually illustrates an exemplary process 400 for segmenting and ranking web site tracking data for real-time analytics reporting of some configurations. More specifically, the process 400 continuously segments and ranks the web site tracking data included in incoming event tracking data communications into one or more aggregation tables.

The process 400 starts when an event tracking data communication is received at 405. By reference to FIG. 1, a real-time server in the real-time analytics tier 140 receives the event tracking data communication from a logging server in the logging tier 120. In some implementations, the real-time server can receive the web site communication when pushed from the logging server as mentioned before.

The process 400 at 410 segments the event tracking data communication into one or more aggregation tables based on a predetermined query. The process 400 can form each aggregation table according to a respective predetermined query. The predetermined query of some configurations organizes the web site tracking data based on one or more different criterion for an associated web property ID of a publisher's web site. For instance, the predetermined query can be based on user data, such a city or other geographical location of the user. By way of example, the process 400 of some configurations segments the event tracking data communication according to a predetermined period of time for a respective associated web property ID of a publisher. In particular, the process 400 can utilize a time stamp of the event tracking data communication in order to determine the one or more aggregation tables in which the tracking data communication is segmented.

After segmenting the web site tracking data, the process 400 at 415 updates the one or more aggregation tables with the segmented web site tracking data. For instance, the process 400 can update one or more different entries in a particular aggregation table. In an example in which the particular aggregation table tracks a number of occurrences for a particular event or visitor action, the process 400 can increment a respective number/count for a particular tracked event such as a number of hits in a corresponding entry of the aggregation table. For each incoming event tracking data communication, the process 400 continuously updates corresponding entries in one or more aggregation tables to facilitate real-time analytics reporting of the web site tracking data with low latency.

After updating the one or more aggregation tables at 415, the process 400 ranks the segmented web site tracking data within each of the aggregation tables. In some configurations, the process 400 ranks the segmented web site tracking data by sorting the segmented web site track data. In the example in which the aggregation table tracks the corresponding number of hits for events or visitor actions, the process 400 can sort the segmented web site tracking data according to the number of hits (e.g., ascending or descending numerical order). Alternatively, the process 400 can sort the segmented web site tracking data based on a non-numerical criterion (e.g., alphabetical order), such as sorting the geographical locations respectively associated with the web site tracking data in the aggregation table. Further, in some configurations, the process 400 can transmit the ranked segmented web site tracking data in the corresponding aggregation table to a front-server for reporting the ranked tracking data. The process 400 then ends.

The following description discusses exemplary data structures utilized by the process 400 described above in FIG. 4 for processing event tracking data included with incoming event tracking data communications. Over a rolling window of time, the multi-tiered real-time analytics system can temporally use corresponding aggregation tables for reporting the event tracking data with respect to a span of time.

Figure 5:
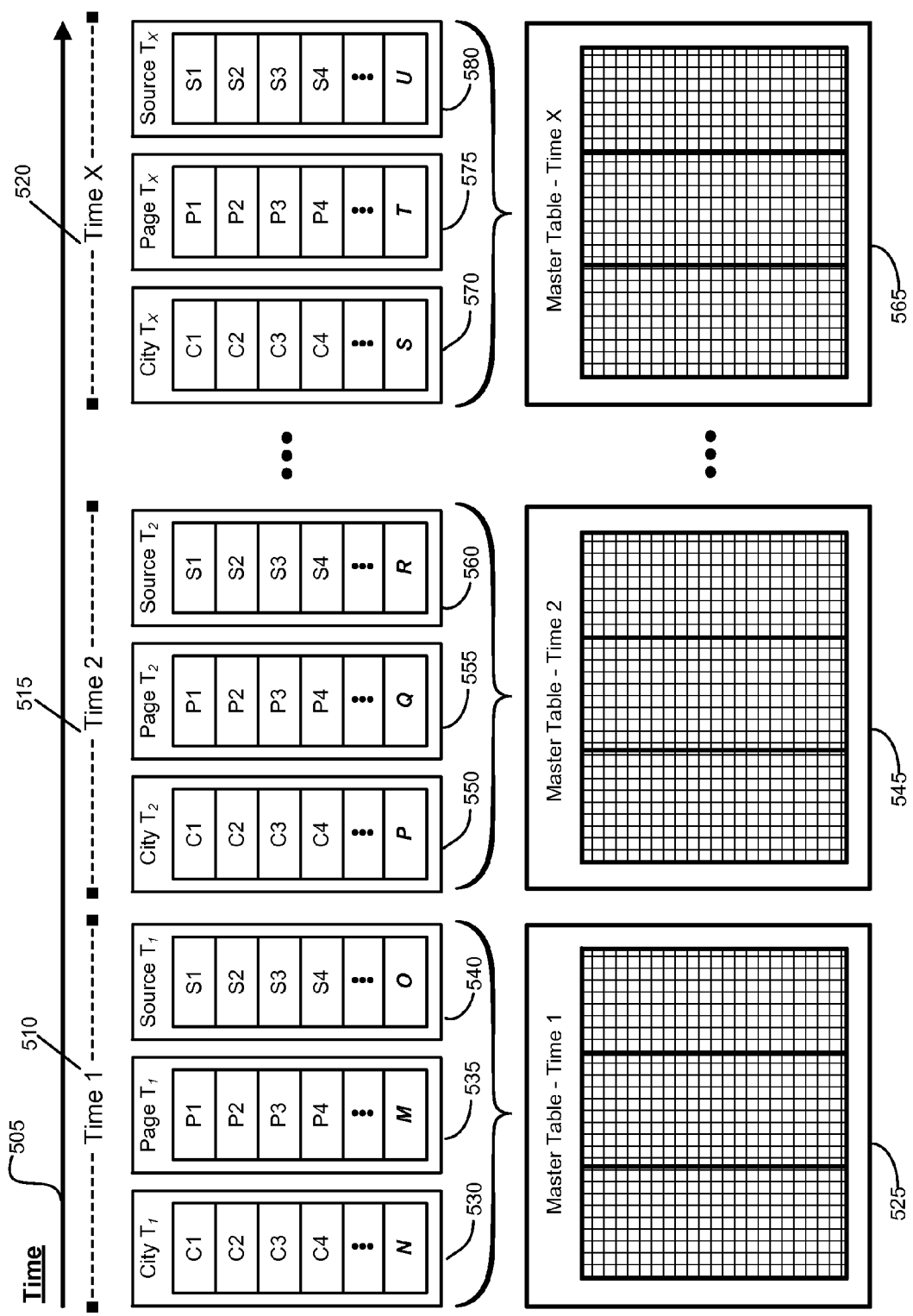
FIG. 5 conceptually illustrates exemplary data structures for one or more aggregations tables over a rolling window of time of some configurations.

FIG. 5 conceptually illustrates exemplary data structures for one or more aggregation tables over a rolling window of time of some configurations. In particular, FIG. 5 depicts a continuous timeline 505 divided into different time intervals 510, 515 and 520 (shown as Time 1 to Time X, where X is a positive integer) in which each respective time interval has associated aggregation tables for a given web property ID. Each associated aggregation table corresponds with a given time interval and includes data for one or more dimensions. A dimension can be understood as including data organized by a particular characteristic in a respective category in which the characteristic can fall under the respective category. For instance, aggregation tables can include respective dimensions related to geographical location, web page, browser, ad source, time, type of visitor activity, etc. By way of example, for the browser category, data that indicates the browser is "Internet Explorer" could be a characteristic that falls under the browser category.

Each time interval shown in FIG. 5 can represent a span of time such as, but not limited to, a number of milliseconds, seconds, minutes, etc., in which incoming event tracking data communications are segmented and processed. The real-time analytics system can configure the time interval for processing incoming event tracking data communications based on particular characteristics of the publisher's web site, and each time interval could represent the same or non-equal periods of time depending on these characteristics. For example, for a given web site with a pattern of web site traffic, a shorter time interval(s) can be set for time periods with more web site traffic while a longer time interval(s) can be set for time periods with less web site traffic. Although the time intervals 515 to 520 are shown in FIG. 5 as contiguous time intervals, some configurations can include overlapping time intervals.

As shown, the time interval 510 has several associated aggregation tables 530, 535, 540 and a master table 525. The master table 525 is formed during the time interval 510 to store all data from each received event tracking data communication during the time interval 510. In some configurations, the real-time analytics system can utilize the master table in the event that the desired event tracking data is not available in any other associated aggregation table for the time interval 510. In this instance, the real-time analytics system can search/query the master table to create a new aggregation table to store this newly segmented data. In some configurations, after this new aggregation table is created, an analogous new aggregation table is created for the each of the remaining time intervals. For example, new respective analogous aggregation tables in the time intervals 515 to 520 can be subsequently created by searching corresponding master tables for the desired event tracking data.

The associated aggregation tables 530, 535 and 540 represent exemplary data structures for storing portions of data (i.e., segmented data) also included in the master table 525. Each aggregation table can include segmented data extracted from incoming event tracking data communications. As illustrated, the aggregation tables 530, 535 and 540 respectively include tracking data related to a city (e.g., geographical location), web page (e.g., URL/URI string indicating a web address) and source of a referral (e.g., an ad source, HTTP referrer, etc.). The exemplary aggregation tables in FIG. 5 can include one or more entries. As illustrated, the aggregation tables 530, 535 and 540 respectively include N, M and O number of entries, where N, M and O are respective non-zero integer values. More specifically, the aggregation table 530 includes entries C1-C4 up to N entries for respective cities, the aggregation table 535 includes entries P1-P4 up to M entries for respective pages, and the aggregation table 540 includes entries S1-S4 up to O entries for respective sources.

For each subsequent time interval, one or more aggregation tables can be utilized that are respectively analogous to the same aggregation tables used in a prior time interval. For instance, aggregation tables 550, 555 and 560 in the time interval 515, and aggregation tables 570, 575 and 580 in the time interval 520 respectively represent analogous data structures to the aggregation tables 530, 535 and 540 in the prior time interval 510. As shown, the aggregation tables 550, 555 and 560 respectively include P, Q and R number of entries, where P, Q and R are respective non-zero integer values. More specifically, the aggregation table 550 includes entries C1-C4 up to P entries that represent respective cities, the aggregation table 555 includes entries P1-P4 up to Q entries that represent respective pages, and the aggregation table 560 includes entries S1-S4 up to R entries that represent respective sources. Similarly, the aggregation table 570 includes entries C1-C4 up to S entries that represent respective cities, the aggregation table 575 includes entries P1-P4 up to T entries that represent respective pages, and the aggregation table 560 includes entries S1-S4 up to U entries that represent respective sources.

Although the above description of FIG. 5 describes exemplary aggregation tables, one of ordinary skill in the art would appreciate that any type of aggregation table (which includes event tracking data in one or more dimensions) could be utilized by the multi-tiered analytics system for reporting real-time analytics data. As mentioned above, the multi-tiered analytics system can dynamically create additional aggregation tables according to new queries and/or to report new or different types of visitor activity and web traffic data.

The following description describes an exemplary process for segmenting web site tracking data in discrete units of time according to some configurations. Segmenting the data according to units of time enables the multi-tiered analytics system to report real-time analytics data in a finely granulated manner. In other words, the real-time web site analytics data can be reported in segments corresponding to smaller units of time.

Figure 6:
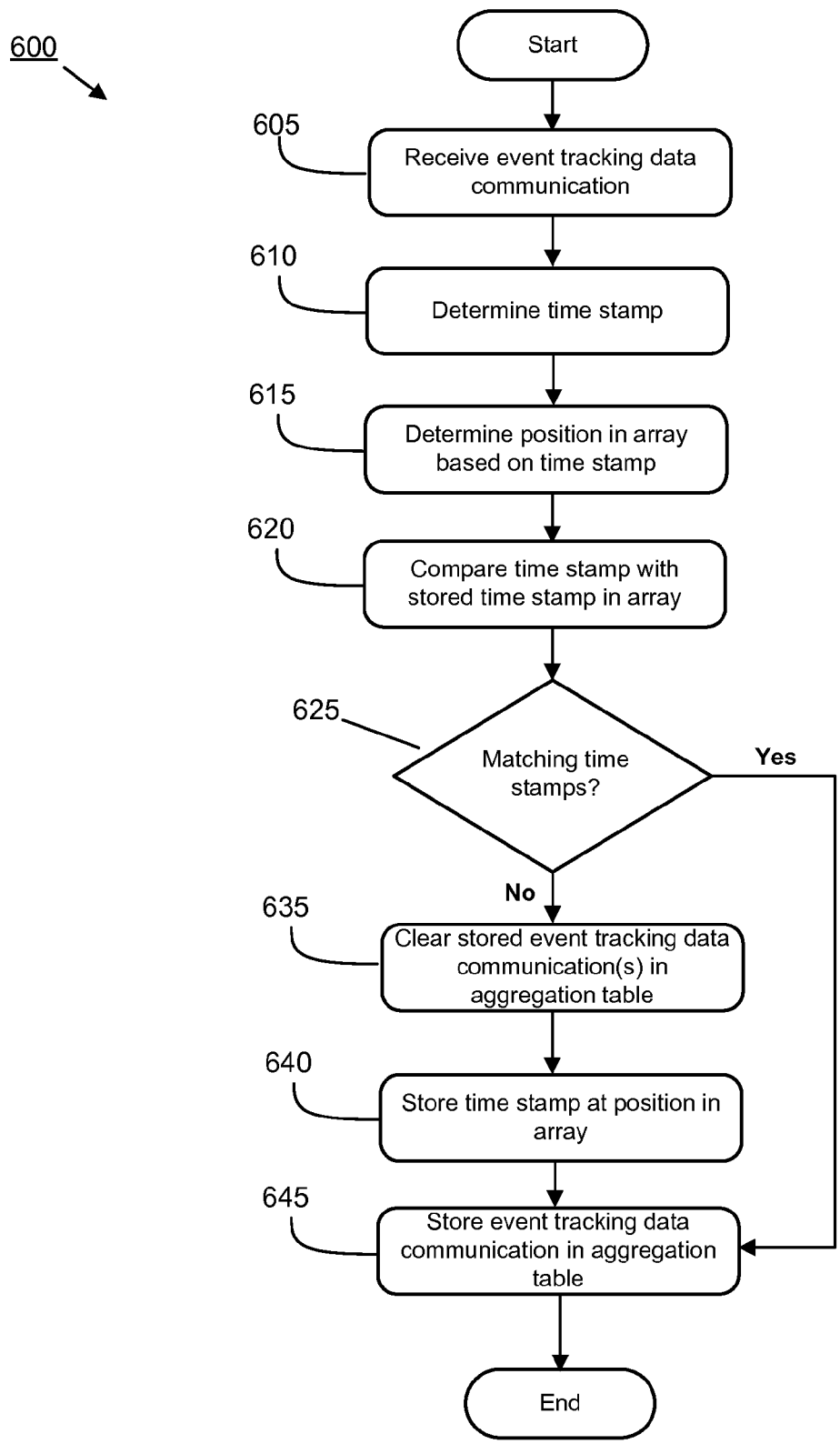
FIG. 6 conceptually illustrates an exemplary process for chronologically segmenting web site tracking data of some configurations.

FIG. 6 conceptually illustrates an exemplary process 600 for chronologically segmenting web site tracking data of some configurations. More specifically, the process 600 can be implemented by a real-time server to segment incoming event tracking data communications into respective aggregation tables based on a respective period of time.

The process 600 starts when an event tracking data communication is received at 605. By reference to FIG. 1, a real-time server in the real-time analytics tier 140 receives the event tracking data communication from a logging server in the logging tier 120. In some implementations, the real-time server can receive the web site communication when pushed from the logging server as mentioned before.

At 610, the process 600 determines a time stamp for the event tracking data communication. As used herein, the term "time stamp" can be understood as a sequence of characters and/or symbols that indicates the date and/or time at which a particular event or visitor action occurred. In some instances, the process 600 can determine the time stamp as it is included in the event tracking data communication as part of the incoming request.

The process 600 continues to 615 to determine a position in an array based on the time stamp for the received event tracking data communication. In some configurations, the position in the array is determined by performing a modulo n operation on the time stamp, where n represents the size of the array. For instance, in an example where the size of the array is 60, the position in the array can be determined by performing a modulo 60 operation on the time stamp. In this example, it can be understood that the array includes sixty positions in which each position logically represents a respective second within a minute time period. The process 600 of some configurations therefore enables segmentation of the web site tracking data according to the size of the array, where each position in the array can be a logical representation of a specific division of time (e.g., second, minute, hour, etc.).

Based on the determined position, the process 600 at 620 compares the time stamp with a stored time stamp at the determined position in the array. For instance, some configurations respectively store associated time stamps for one or more positions in the array for incoming event tracking data communications. Each stored time stamp can reference one or more different aggregation tables that segment the web site tracking data according to different respective predetermined queries.

Based on the comparison at 620, the process 600 can decide at 625 whether the time stamps match. In an instance in which the time stamps match one another, the process 600 at 630 stores the event tracking data communication based on a particular predetermined query in an aggregation table referenced from the position in the array. Further, as discussed above in reference to FIG. 4, after the event tracking data communication is stored in the aggregation table, the tracking data stored in the aggregation table can be ranked (i.e., sorted) according to one or more predetermined criteria (e.g., a number of hits, geographical location, etc.). The process 600 then ends.

Alternatively, in an instance in which the time stamps do not match, the process 600 continues to 635 to clear (i.e., erase or delete) one or more (if any) stored web site traffic data entries in the aggregation table referenced from the position in the array. The process 600 at 640 stores the time stamp at the position in the array. At 645, the process 600 then stores the web site traffic data communication in the aggregation table referenced from the position in the array according to the predetermined query. The process 600 then ends.

In some configurations, the array is referenced from a hash table with one or more hash table entries. Each hash table entry can represent a respective web property identity for a particular publisher. The expression "hash table" as used herein can be understood as a data structure including one or more unique keys and corresponding one or more values in which each key is associated with one or more values. In this manner, a hash table of web property identities can be provided to enable segmenting the data according to an associated publishers web property identity (e.g., for a particular web site).

Figure 7:
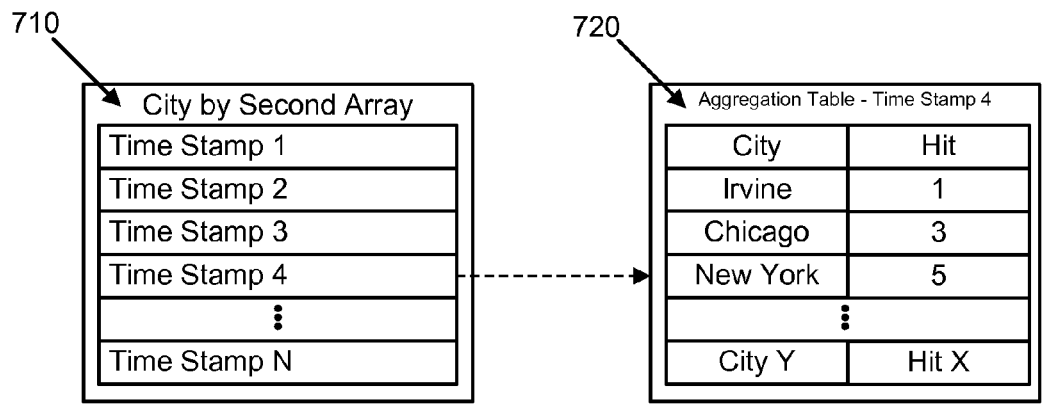
FIG. 7 conceptually illustrates exemplary data structures for segmented web site tracking data and an associated aggregation table of some configurations.

The following discussion describes exemplary data structures that could be used by the processes 400 and 600 described above in FIGS. 4 and 6 for segmenting incoming event tracking data communications. FIG. 7 conceptually illustrates exemplary data structures for segmented web site tracking data and an associated aggregation table of some configurations. More specifically, FIG. 7 depicts an exemplary array of time stamps and a corresponding aggregation table referenced from one particular time stamp entry in the array.

As shown in FIG. 7, an array 710 includes 1 to N time stamp entries. The array 710 conceptually represents a city by second array in which each time stamp entry includes a reference to an aggregation table that segments the web site tracking data according to a geographical location (i.e., the city) and tracks associated hits for each respective geographical location associated with the web site tracking data. Referring to FIG. 6, some configurations can include an array with sixty entries in which each entry/position in the array logically represents a different second within a minute.

A particular entry in the array 710 can include a reference to a corresponding aggregation table. For instance, as illustrated in FIG. 7, the entry representing "Time Stamp 4" includes a reference/pointer to an aggregation table 720. The aggregation table 720 as shown segments the web site tracking data according to a predetermined query based on the geographical location (i.e., the city) associated with the web site tracking data. In this example, the aggregation table 720 includes two columns for 1 to Y entries corresponding to respective geographical locations and an associated number/count of hits. In other words, the aggregation table 720 keeps a count of hits/requests for each geographical location. Referring to FIG. 4, the process 400 can update the aggregation table at 415 to increment the count as shown in the aggregation table 720 in FIG. 7 and then rank the entries in the aggregation table 720 to sort the entries in a specified order (e.g., ascending or descending). As depicted in FIG. 7, the aggregation table 720 ranks the entries in ascending order by the number of hits.

The following discussion describes an exemplary process in which a real-time server can implement a process for providing fine-grain locking of a data structure. In some instances, latency in the system can be introduced if the entire data structure is locked during a time period in which the data structure is concurrently accessed by several processes and/or threads. For a real-time server that executes multiple processes concurrently and/or a multi-threaded application, locking access to such a data structure is necessary to ensure the integrity of a shared resource (such as the data stored in the data structure). However, in order to meet the low latency requirements of reporting web site analytics data in real-time, the real-time server of some configurations can lock only a portion of the data structure to enable concurrent access to other portions of the data structure.

Figure 8:
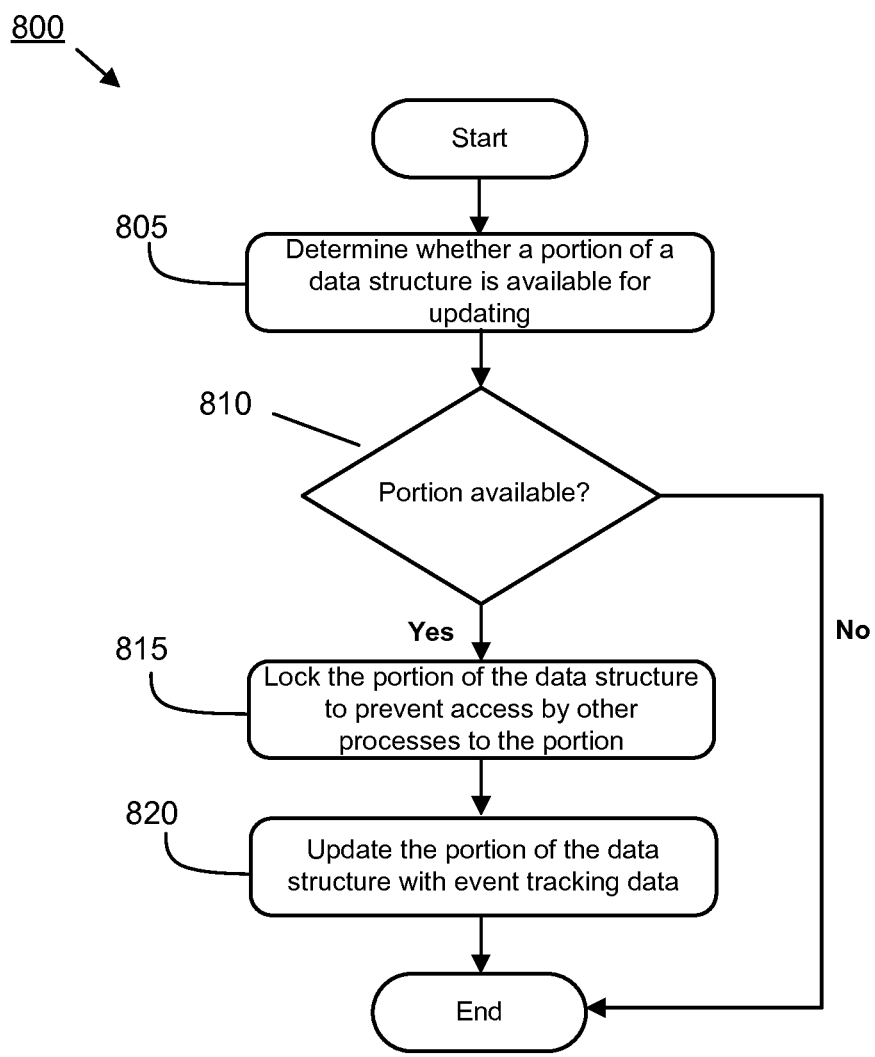
FIG. 8 conceptually illustrates an exemplary process for providing fine-grain locking to prevent access to a portion of a data structure of some configurations.

FIG. 8 conceptually illustrates an exemplary process 800 for providing fine-grain locking to prevent access to a portion of a data structure of some configurations. More specifically, a real-time server can implement the process 800 in order to provide fine-grain locking of a portion of a shared data structure. In some configurations, such a data structure can be an aggregation table as described herein, which includes a set of one or more rows and/or a set of one or more columns of data. An exemplary data structure used by process 800 will be described in further detail with reference to FIG. 10 below.

The process 800 starts when the process 800 determines whether a portion of a data structure is available for updating with event tracking data based on a time stamp of the event tracking data. Determining whether the portion of the data structure is available can include determining whether the portion is locked. In a system with shared/common resources, locking a shared data structure can prevent deadlock and race conditions when concurrent processes and/or threads attempt to access the shared data structure. For instance, different concurrent processes and/or threads can attempt to access the portion of the data structure to perform different operations. The different operations can include a read, write, or modify operation to the portion of the data structure.

In some configurations, the process 800 receives the event tracking data at 805 in an event tracking data communication. Based on an included time stamp in the event tracking data, the process 805 can check an availability of the portion the data structure corresponding to the time stamp. In some configurations, the process 800 can attempt to access a portion of the data structure that is a respective row within a table data structure. The table data structure can include one or more respective rows that store event tracking data.

Based on the determination at 805, the process 800 at 810 can decide whether to access the portion of the data structure. In an instance in which the portion of the data structure is not available (i.e., locked), the process 800 then ends. In some configurations, the process 800 can discard the event tracking data if the portion of the data structure is unavailable/locked.

Alternatively, in an instance in which the portion of the data structure is available, the process 800 at 815 locks the portion of the data structure to prevent access by other processes and/or threads. After the portion of the data structure is locked at 815, one characteristic of a fine-grain locking scheme is that a second portion of the data structure can be available for updating with a second set of event tracking data. As mentioned before, in some configurations the data structure can be a particular aggregation table with event tracking data. By implementing a fine-grain locking scheme, the process 800 can enable other rows in the aggregation table to not be locked (i.e., available for accessing) when the respective row is locked. In other words, the process 800 provides granularity in controlling which portion(s) of the aggregation table that are locked. Hence, the performance of the real-time server for reporting the real-time web analytics data can be improved because concurrent access is provided to other processes and/or threads to different portions of a shared data structure.

After locking the portion at 815, the process 800 then continues to 820 to update the portion of the data structure with the event tracking data. In some configurations, the event tracking data stored in the data structure can include data that tracks a number of occurrences for different visitor actions, events and/or user information. For instance, the process 800 in some configurations can increment a number of hits stored in the portion of the data structure in which the hits correspond with a particular web page, web property identity, geographical location and/or other segmented data based on different criterion, etc. After updating the portion of the data structure, the process 800 can release the locked portion of the data structure to allow access to the portion by other processes and/or threads. The process 800 then ends.

The following discussion describes an exemplary process for releasing a portion of a data structure that has been locked (e.g., as described in the exemplary process 800 above). In a real-time server in which concurrent processes and/or threads can access a shared data structure, a process can implement a fine-grain locking scheme which locks a portion of the shared data structure. To prevent potential resource starvation of the shared data structure (e.g., where a process is perpetually denied access to the shared resource), the exemplary process described in further detail below can release the locked portion of the data structure to enable access of the portion by other processes and/or threads.

Figure 9:
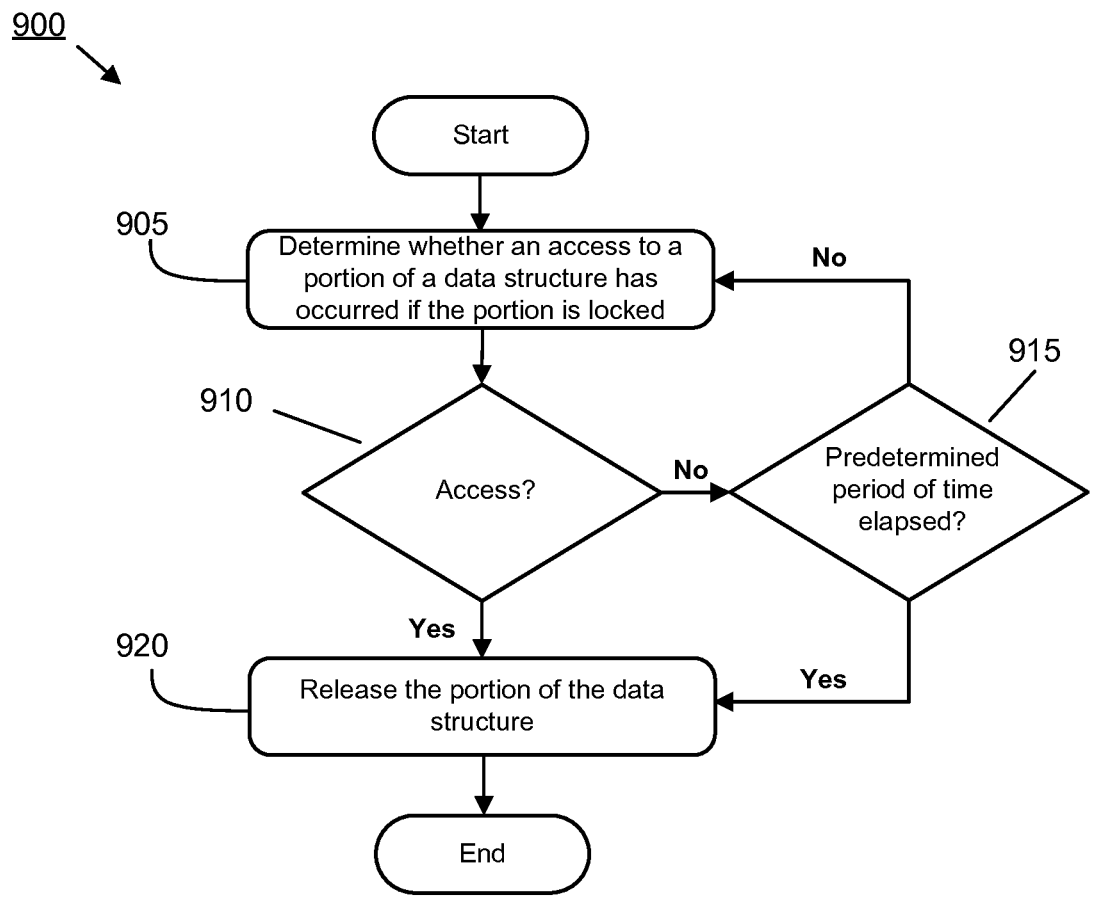
FIG. 9 conceptually illustrates an exemplary process for releasing a locked portion of a data structure of some configurations.

FIG. 9 conceptually illustrates an exemplary process 900 for releasing a locked portion of a data structure of some configurations. More specifically, a real-time server can implement the process 900 in order to release the locked portion of the data structure in which the process 800 described by reference in FIG. 8 locks the portion of the data structure. In some configurations, the process 900 can be performed conjunctively with the process 800 described above in FIG. 8 to implement a fine-grain locking scheme for such a shared data structure.

The process 900 begins when a determination is made whether an access to a portion of a data structure has occurred if the portion is locked. In some configurations, after the portion is locked, the process 900 can determine that an access to the locked portion has occurred. The access to the locked portion of the data structure can include a read, write, or modify operation. In such an occurrence, the process 900 at 920 releases the portion of the data structure if the access has occurred. Upon being released, the portion of the data structure is no longer locked and other processes can now access the portion. The process 900 then ends.

Alternatively, in an instance in which the access has not occurred at 910, the process 900 continues to 915 to determine whether a predetermined period of time has elapsed from the initial time that the portion was locked. In some configurations, the process 900 can wait for a set period of time (e.g., microseconds, milliseconds, seconds, minutes, etc.) to allow the access to the locked portion of the data structure to occur. In an instance in which the predetermined period of time has not yet elapsed, the process 900 can return to 905 and repeat the steps at 905 and 910. In this manner, the process 900 can continually check whether the access to the locked portion of the data structure has occurred before the predetermined period of time has elapsed.

The process 900 can also configure the aforementioned period of time to optimize the latency in which real-time analytics data is reported by the real-time server. For instance, in a respective real-time server, a write operation for temporarily storing a respective event tracking data (e.g., as included in a unique event tracking data communication) in the data structure can occur once at most. The respective event tracking data is written only once because the respective event tracking data is associated with a unique visitor action and/or event for a particular time stamp (and also associated with a particular web property ID of a web site). It should be understood, however, that the stored event tracking data can be read one or more times by the real-time server in reporting the web analytics data. Given these considerations, the process 900 can configure the predetermined period of time based on the type of operation performed on the data structure. In some configurations, the process 900 can wait a first period of time for a read operation to the locked portion of the data structure. In an instance in which a write operation is to be performed on the locked portion, the process 900 can wait a second period of time that is a longer period of time than the first period of time.

If the predetermined period of time has elapsed at 915, the process 900 continues to 920 to release the locked portion of data structure. After being released, the portion of the data structure is available for access by other processes and/or threads. The process 900 then ends.

The following discussion describes an exemplary data structure in different stages in which the processes 800 and 900 described above by reference to FIGS. 8 and 9 can implement the fine-grain locking scheme for a data structure shared among several processes and/or threads in a real-time server.

FIG. 10 conceptually illustrates an exemplary data structure in different stages 1010-1030 in which a process for fine-grain locking of a portion of the data structure can access of some configurations. More specifically, the data structure described in further detail below includes an array of time stamp entries in which each array entry further references respective aggregation tables. For the sake of simplicity, the time stamps illustrated in FIG. 10 are shown as different integer numbers. However, one of ordinary skill in the art would recognize that each of the time stamps could be represented using a combinations of different numbers, characters and/or symbols and still be within the scope of the subject technology. FIG. 10 will be described by reference to portions of FIGS. 8 and 9.

In the first stage 1010, an event tracking data 1015 can include data for a respective "hit" (i.e., event tracking data communication/request) and an included associated timestamp (i.e., "Time Stamp 2") for the hit. As depicted in FIG. 10, an array 1025 includes 1 to N time stamp entries. The array 1025 conceptually represents a city by second array in which each time stamp entry includes a reference to an aggregation table that segments the event tracking data according to a geographical location (i.e., the city) and tracks associated hits for each respective geographical location associated with the respective event tracking data. Referring to FIG. 8, the process 800 at 805 can determine whether a portion of the data structure is available for updating based on the time stamp included in the event tracking data. In FIG. 10, based on the included time stamp in the event tracking data 1015, an entry 1040 of the array 1025 is determined whether it is available for updating with the included data in the event tracking data 1015. In particular, the time stamp included in the event tracking data 1015 matches the corresponding time stamp in the entry 1040 and therefore will be checked for availability in updating.

A particular entry in the array 1025 can include a reference to a corresponding aggregation table. For instance, as illustrated in FIG. 10, the entry representing "Time Stamp 2" includes a reference/pointer to an aggregation table 1035. The aggregation table 1035 as shown segments the event tracking data according to a predetermined query based on the geographical location (i.e., the city) associated with the event tracking data. In this example, the aggregation table 1035 includes two columns for 1 to Y entries corresponding to respective geographical locations and an associated number/count of hits. In other words, the aggregation table 1035 keeps a count of hits/requests for each geographical location. As further depicted in FIG. 10, the aggregation table 1035 ranks the entries in ascending order according to the number of hits.

In the second stage 1020, a row 1045 (as indicated by the highlight) corresponding to the entry 1040 in the array 1025 is locked to prevent access to other processes/threads. By way of example, the portion of the array 1025 could be locked using a semaphore that limits the number of processes/threads that can access the portion along with an associated queue of processes/threads for scheduling (i.e., determining the order) access to the portion of the array 1025. In another example, an array of mutual exclusive locks (i.e., mutex locks) are utilized in which each entry in the array corresponds with a respective entry in the array 1025. Additionally, the array of mutex locks can include mutex locks to lock each portion (e.g., row and/or column) of the aggregation table 1035. Different types of mutex locks can be provided depending on the type of operation on the array 1025 and/or aggregation table 1035. For instance, a reader lock or a write lock could be respectively provided for read or write operations to a respective entry in the array 1025 and/or portion of the aggregation table 1035. In one example, more than one process/thread can obtain a reader lock while only one process/thread can obtain a writer lock for accessing the entry in the array 1025 and/or portion of the aggregation table 1035. Referring to FIG. 8, after determining the portion of the data structure is available for updating, the process 800 at 815 locks the portion of the data structure to prevent access by other processes/threads.

The third stage 1030 illustrates the aggregation table 1035 after the row 1045 from the second stage 1020 is updated to increment the count of hits/requests for corresponding event tracking data. Referring to FIG. 8, the process 800 at 820 updates the portion of the data structure with the event tracking data. As shown in FIG. 10, the aggregation table 1035 includes an updated/incremented count 1050 ("6") for the corresponding geographical location of "New York" in the same row of the aggregation table 1035. Referring to FIG. 9, the process 900 can release the locked portion of the data structure at 920 after updating the locked portion. In FIG. 10, the locked portion of the aggregation table 1035 corresponding to the row 1045 is now released after being updated and now available for access by other processes and/or threads.

The following section describes exemplar attributes and data structures of the real-time analytics data. An associated real-time server can temporarily store such attributes and data structures illustrated in FIG. 11 for reporting real-time analytics data.

Figure 11:
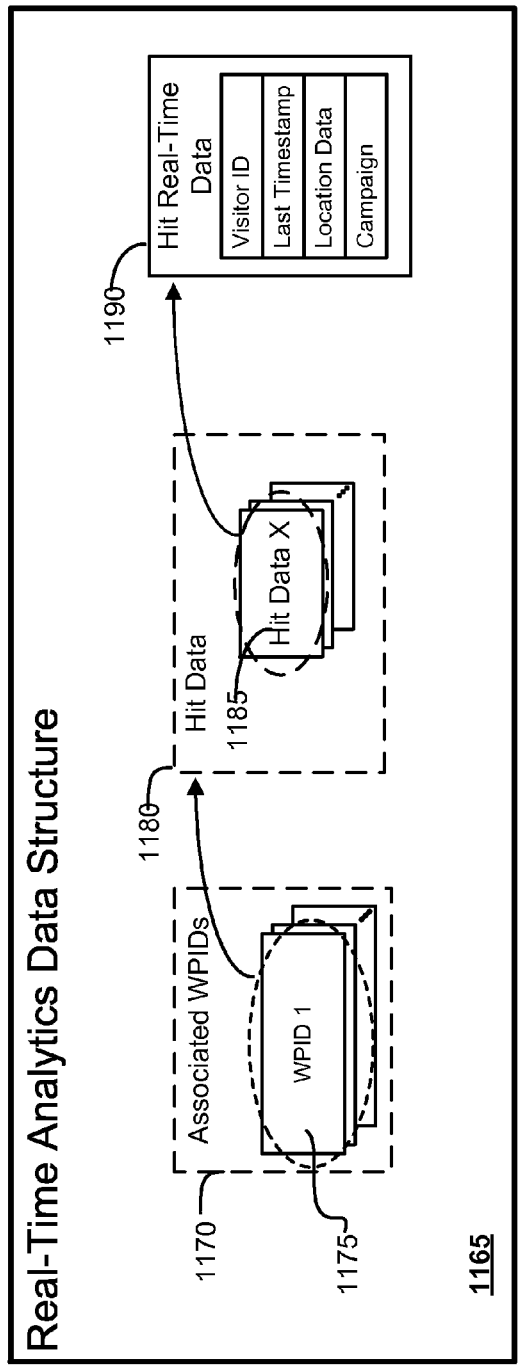
FIG. 11 conceptually illustrates various attributes and data structures that are included in some configurations of the multi-tiered real-time analytics system.

FIG. 11 conceptually illustrates different attributes and data structures that are included in some configurations of the multi-tiered real-time analytics system. More specifically, FIG. 11 depicts exemplar attributes and data structures of a real-time analytics data structure 1165 that are based on event tracking data communications. For instance, an event tracking data communication can include data for identifying a user session of a visitor, a location of the visitor, and other real-time analytics attributes. A real-time server can temporarily store the real-time analytics attributes and data structures shown in FIG. 11 based on the aforementioned data included in the event tracking data communication.

In some implementations, the real-time analytics data structure 1165 can be understood as a container that is a collection of the various attributes and data structures based on one or more event tracking data communication(s). As shown in FIG. 11, the real-time analytics data structure 1165 includes an associated web property identity (WPID) data structure 1170, associated WPID attribute 1175, hit data structure 1180, hit data element 1185 and hit real-time data attributes 1190. Although these attributes and data structures are represented as included in a single data structure, some implementations can store each of the attributes and data structures in separate data structures that include any combination of data attributes. The aforementioned attributes and data structures are described in further detail as set forth below.

As illustrated, the associated web property identity (WPID) data structure 1170 includes one or more associated WPID attributes. Each associated WPID attribute can represent a publisher of a web site which is associated with the real-time server. As shown, the associated WPID attribute 1175 corresponds with a publisher with a "WPID 1" that represents a unique string ID for the publisher. One of ordinary skill in the art would understand that the unique string ID could be formed from any combination of alphanumeric characters and/or symbols.

In some implementations, each associated WPID attribute can include a reference to the hit data structure 1180. The hit data structure 1180 includes attributes for each event tracking data communication for the publisher. As shown, the hit data structure 1180 includes hit data element 1185 corresponding to a particular event tracking data communication "X" for the publisher corresponding with associated WPID attribute 1175. The hit data element 1185 is shown in more detail in breakout section 1190.

As further shown in FIG. 11, the hit data element 1185 can include the real-time data attributes 1190 corresponding to a visitor ID, a last timestamp, location data and campaign data. The visitor ID attribute represents a unique ID string associated with a unique visitor session. The visitor ID attribute does not necessarily identify a particular end-user but instead corresponds with a particular user session on the publisher's web site. For example, the visitor ID can be a randomized identifier that is determined based on different information such as the visitor's web browser or client, the timestamp associated with the visitor's session, and/or the visitor's hostname, etc. Additionally, the location data does not identify the visitor's personal address, but is related to a geographical location (e.g., city) that can be determined based on the IP address assigned to the visitor (e.g., by an Internet service provider).

Next, the last timestamp attribute of the real-time data attributes 1190 represents the most recent timestamp in which the unique visitor visited the publisher's web site. A timestamp in some implementations is a sequence of alphanumeric characters that denotes the date and/or time in which a particular event occurred. The location data attribute represents the geographical location of the unique visitor, such as a specified city, state, county, country, zip code, global positioning system coordinates, and/or geographical coordinates (e.g., latitude, longitude, elevation), etc. Lastly, the campaign attribute identifies a particular marketing campaign corresponding with a set of associated marketing activities. For instance, the associated marketing activities can respectively correspond to a set of web pages on the publisher's web site. Any visitor activity/action related to the set of web pages on the publisher's web page can then be associated with the marketing campaign. In this manner, the campaign attribute can identify the marketing campaign associated with the visitor action.

Different implementations can implement and organize the above described attributes and data structures in different ways. For instance, the real-time analytics data structure 1165 of some configurations can be implemented as a collection of tree data structures, otherwise known as a "forest." In this exemplar, a root node of a particular tree corresponds with a particular WPID (i.e., publisher identity) and each direct child of the root node can represent multiple visitor nodes that are associated with respective visitors to the publisher's web site. For each visitor node, visitor specific attributes are stored. Each visitor node can have multiple direct child nodes that represent the associated visitor's actions based on a timestamp. The timestamp of the last action for the associated visitor can also be stored with the parent associated visitor node described above. Alternatively or conjunctively, certain visitor attributes can be implemented as discrete nodes, such as a node including a city identifier with respective direct child nodes corresponding to a city name and geographical coordinates (e.g., latitude, longitude, etc.).

The following section describes a software architecture of a real-time server that can implement the above described processes and data structures as a computer program running on a particular machine, such as a computer, or stored as instructions in a computer readable medium.

Figure 12:
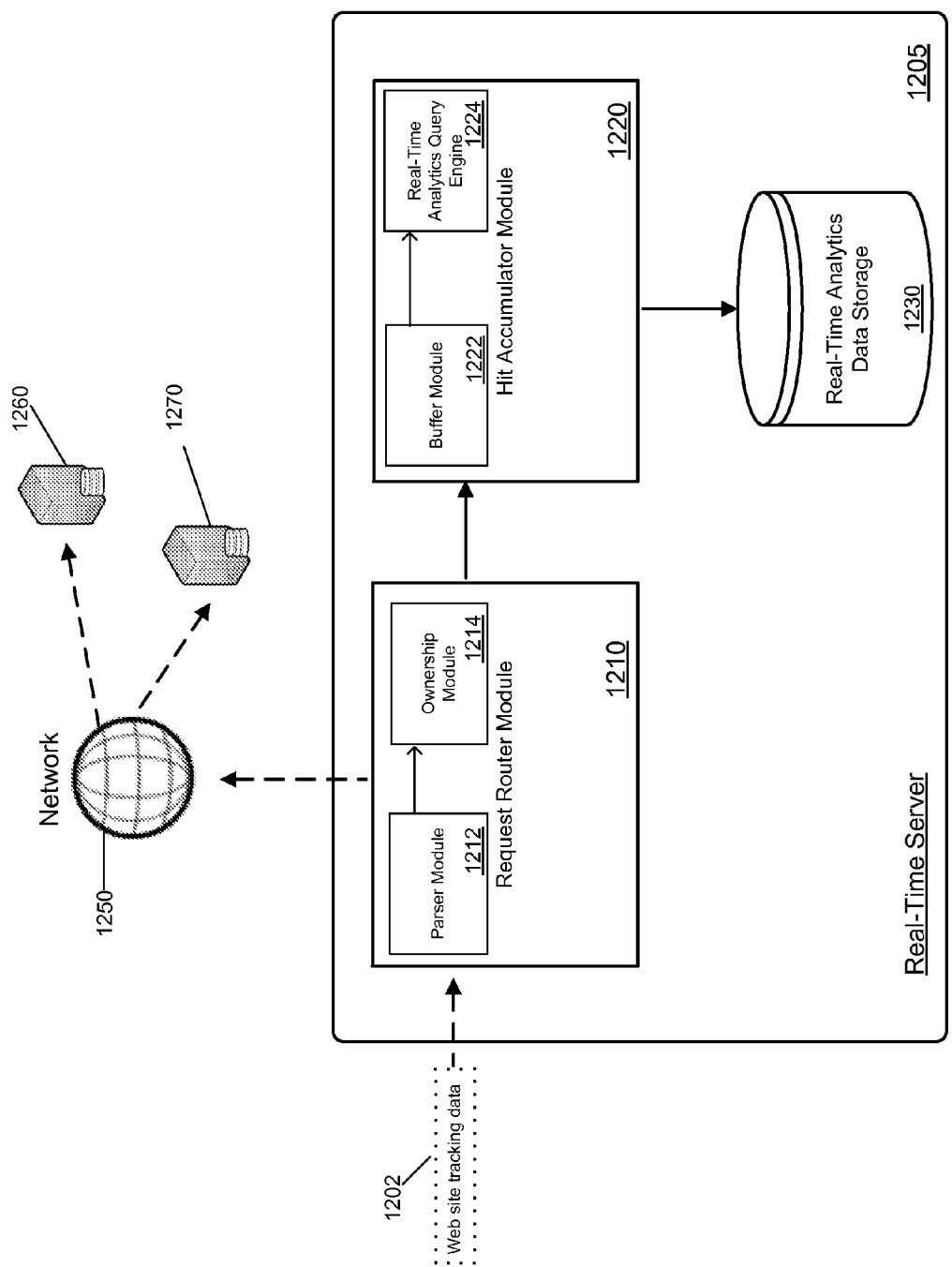
FIG. 12 conceptually illustrates an exemplary software architecture of an real-time server of some configurations.

FIG. 12 conceptually illustrates an exemplary software architecture of a real-time server 1205 of some configurations. In particular, FIG. 12 shows various modules and components of the real-time server 1205 for implementing the above described processes in FIGS. 2-4, 6, 8 and 9 and the data structures in FIGS. 5, 7, 10 and 11. In some configurations, the software architecture of the real-time server is part of a server-based implementation running a particular machine connected to a network.

As illustrated in FIG. 12, the real-time server 1205 can include a request router module 1210 for parsing and routing event tracking data, a hit accumulator module 1220 for buffering and querying real-time analytics data, and a real-time analytics data storage 1230 for temporarily storing real-time analytics data. The real-time analytics data storage 1230 in some implementations is a type of volatile and non-persistent storage (e.g., RAM). The operation of the aforementioned modules of the real-time server 1205 are discussed in the following description.

The real-time server 1205 can receive event tracking data 1202 in a request router module 1210. The event tracking data 1202 can be in the form of an event tracking data communication that is received over a network 1250. As shown, the request router module 1210 includes a parser module 1212 and an ownership module 1214. The parser module 1212 of some implementations can parse the event tracking data to extract real-time analytics data and to subsequently transmit the real-time analytics data to the ownership module 1214. The ownership module 1214 determines a set of associated real-time servers that are owners of the event tracking data corresponding with a publisher's web site. In an instance where the ownership module 1214 determines that the event tracking data 1202 is not associated with the real-time server 1205, the request router module 1210 can route the event tracking data 1202 over the network 1250 to other associated real-time servers. As shown in FIG. 12, additional real-time servers 1260 and 1270 are connected to the network 1250. Alternatively, in the event that the ownership module 1214 determines that the real-time server 1205 is associated with the event tracking data 1202, the request router module 1210 routes (i.e., sends) the event tracking data to the hit accumulator module 1220 for further processing and temporary storage.

The hit accumulator module 1220 receives the event tracking data routed from the request router module 1210. In some implementations, the hit accumulator module 1220 includes a buffer module 1222 as shown for queuing/aggregating the event tracking data. The buffer module 1222 can be implemented in different ways. For instance, the buffer module 1222 could utilize a first-in first-out (FIFO) scheme in which the earliest received event tracking data is transferred out before later received data. In other instances, the buffer module 1222 could employ a last-in first-out (LIFO) scheme that is analogous to a stack in which the later received data is transferred out before earlier received data.

As shown in FIG. 12, the buffer module 1222 then sends event tracking data to a real-time analytics query engine 1224 in the hit accumulator module 1220. The real-time analytics query engine 1224 of some configurations performs query processing and data management of the real-time analytics data storage 1230. By way of example, the real-time analytics query engine 1224 can perform write and/or update operations to temporarily store the event tracking data to the real-time analytics data storage 1230. Given the requirements of low latency involved with reporting real-time analytics data, the real-time analytics data storage 1230 can be implemented to provide fast access to stored real-time analytics data. In particular, the real-time analytics data storage 1230 can be implemented as fast non-persistent/volatile memory that is periodically flushed and/or overwritten with more recent event tracking data. In this manner, the overhead of managing the data in the real-time analytics data storage 1230 is reduced because longevity of the data is not a primary objective.

In some implementations, the hit accumulator module 1220 can execute queries for sorting and/or aggregating the received event tracking data for temporary storage in the real-time analytics data storage 1230. For instance, referring back to FIG. 1, a real-time server from the real-time analytics tier 140 can aggregate and sort the real-time analytics data according to one or more predetermined queries for temporary storage and then send the aggregated and/or sorted real-time analytics data to the front-end tier 150 for reporting the real-time analytics data. As shown in FIG. 12, the real-time analytics query engine 1224 of hit accumulator module 1220 can execute the queries in order to sort and/or aggregate the received event tracking data before temporarily storing the real-time analytics data in the real-time analytics data storage 1230. The real-time server 1205 can then send the stored aggregated and/or sorted real-time analytics data to a front-end server for reporting and/or presenting real-time analytics data to an end-user.

Moreover, the hit accumulator module 1220 can be configured to segment the received event tracking data into one or more different aggregation tables. For instance, referring back to FIG. 4, the process 400 at 415 segments the event tracking data communication into one or more aggregation tables. As shown in FIG. 12, the real-time analytics query engine 1224 of hit accumulator module 1220 can extract event tracking data from the buffer module 1222 for placement into one or more different aggregation tables in the real-time analytics data storage 1230. Referring to FIG. 5, the one or more aggregation tables can correspond to the different tables in the time intervals 510-520 shown in the timeline 505.

The real-time analytics query engine 1224 is can be configured to lock a respective portion of one or more different aggregation tables stored in the real-time analytics data storage 1230 and to update the one or more aggregation tables with the event tracking data from the buffer module 1222. At least a respective second portion of the one or more aggregation tables is not locked when the respective portion of the one or more aggregation tables is locked. Referring back to FIG. 10, in the second stage 1040, a row 1045 corresponding to the entry 1040 in the array 1025 is locked to prevent access to other processes/threads.

The real-time analytics query engine 1224 is further configured to release the respective portion of the one or more aggregations tables after updating the one or more aggregation tables. Referring to FIG. 10, the row 1045 is released in the third stage 1030 after the row 1045 from the second stage 1020 is updated to increment the count of hits/requests for corresponding event tracking data.

The following section describes an exemplary system that implements aspects of the above described invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 13:
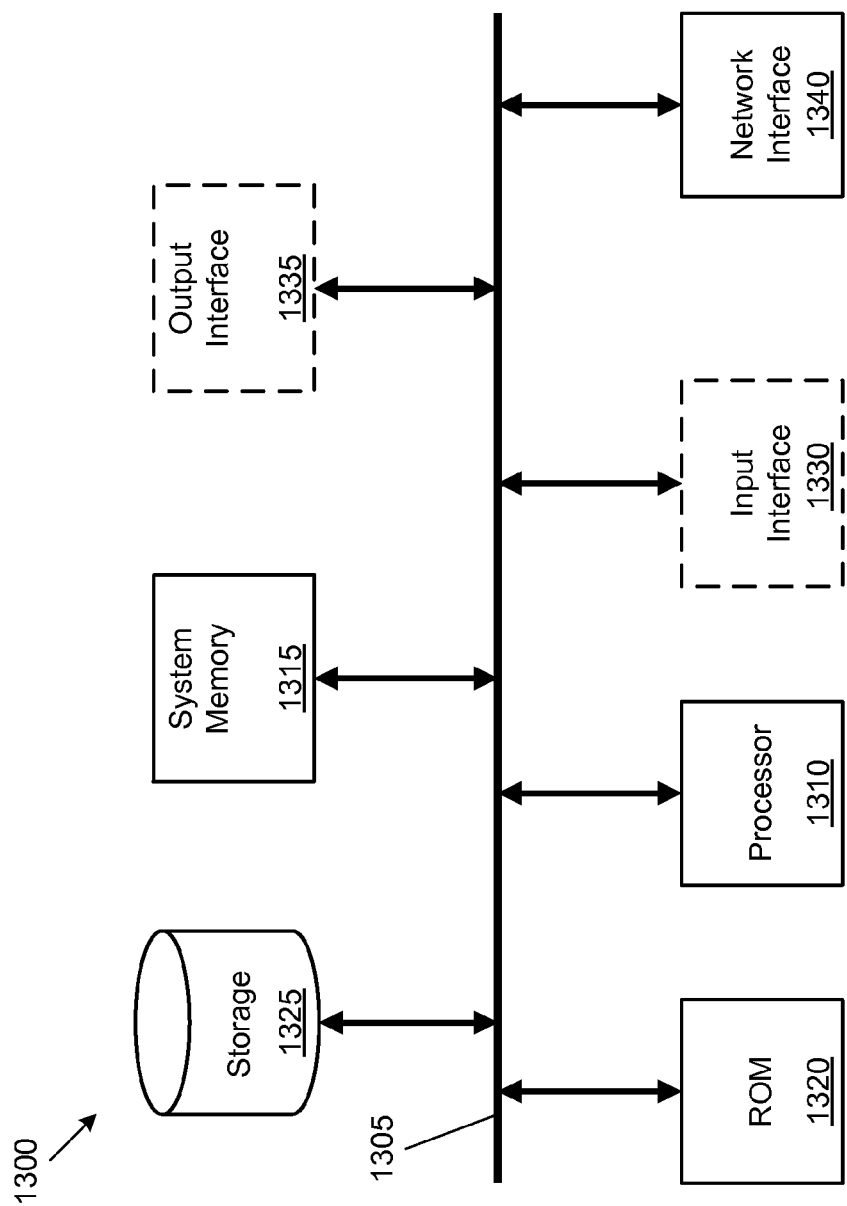
FIG. 13 conceptually illustrates an electronic system in which some configurations are implemented.

FIG. 13 conceptually illustrates a system 1300 with which some implementations of the subject technology may be implemented. The system 1300 can be a computer, phone, PDA, or any other sort of electronic device. Such a system includes various types of computer readable media and interfaces for various other types of computer readable media. The system 1300 includes a bus 1305, processing unit(s) 1310, a system memory 1315, a read-only memory 1320, a storage device 1325, an optional input interface 1330, an optional output interface 1335, and a network interface 1340.

The bus 1305 collectively represents all system, peripheral, and chipset buses that communicatively connect the numerous internal devices of the system 1300. For instance, the bus 1305 communicatively connects the processing unit(s) 1310 with the read-only memory 1320, the system memory 1315, and the storage device 1325.

From these various memory units, the processing unit(s) 1310 retrieves instructions to execute and data to process in order to execute the processes of the invention. The processing unit(s) can be a single processor or a multi-core processor in different implementations.

The read-only-memory (ROM) 1320 stores static data and instructions that are needed by the processing unit(s) 1310 and other modules of the system 1300. The storage device 1325, on the other hand, is a read-and-write memory device. This device is a non-volatile memory unit that stores instructions and data even when the system 1300 is off. Some implementations of the invention use a mass-storage device (such as a magnetic or optical disk and its corresponding disk drive) as the storage device 1325.

Other implementations use a removable storage device (such as a flash drive, a floppy disk, and its corresponding disk drive) as the storage device 1325. Like the storage device 1325, the system memory 1315 is a read-and-write memory device. However, unlike storage device 1325, the system memory 1315 is a volatile read-and-write memory, such a random access memory. The system memory 1315 stores some of the instructions and data that the processor needs at runtime. In some implementations, the invention's processes are stored in the system memory 1315, the storage device 1325, and/or the read-only memory 1320. For example, the various memory units include instructions for processing multimedia items in accordance with some implementations. From these various memory units, the processing unit(s) 1310 retrieves instructions to execute and data to process in order to execute the processes of some implementations.

The bus 1305 also connects to the optional input and output interfaces 1330 and 1335. The optional input interface 1330 enables the user to communicate information and select commands to the system. The optional input interface 1330 can interface with alphanumeric keyboards and pointing devices (also called "cursor control devices"). The optional output interface 1335 can provide display images generated by the system 1300. The optional output interface 1335 can interface with printers and display devices, such as cathode ray tubes (CRT) or liquid crystal displays (LCD). Some implementations can interface with devices such as a touchscreen that functions as both input and output devices.

Finally, as shown in FIG. 13, bus 1305 also couples system 1300 to a network interface 1340 through a network adapter (not shown). In this manner, the computer can be a part of a network of computers (such as a local area network ("LAN"), a wide area network ("WAN"), or an Intranet, or an interconnected network of networks, such as the Internet. Any or all components of system 1300 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for providing fine-grain locking to prevent access to a portion of a data structure, the method comprising:

determining, by a processor, whether a portion of a data structure stored in memory is available for updating with event tracking data based on a time stamp of the event tracking data, wherein the event tracking data tracks an activity associated with a source of the event tracking data wherein the event tracking data includes web site traffic data included in a Hypertext Transfer Protocol (HTTP) request associated with a web site;

discarding, by the processor, the event tracking data if the portion of the data structure is locked;

locking, by the processor, the portion of the data structure stored in the memory to prevent access by other processes to the portion if the portion of the data structure is available; and updating, by the processor, the portion of the data structure stored in the memory with the event tracking data, wherein updating the portion of the data structure comprises incrementing a number of hits stored in the portion of the data structure.

2. The method of claim 1, wherein the data structure is a table, and the table comprises a set of respective rows.

3. The method of claim 2, wherein the portion of the data structure comprises a respective row in the table.

4. The method of claim 3, wherein at least one other respective row in the table is not locked when the respective row in the table is locked.

5. The method of claim 1 wherein the access by other processes comprises a read, write or modify operation to the portion of the data structure.

6. The method of claim 1, wherein a second portion of the data structure is available for updating with a second set of event tracking data after the portion of the data structure is locked.

7. The method of claim 1, wherein determining whether the portion of the data structure is available comprises determining whether the portion is locked.

8. The method of claim 1, further comprising:
releasing the locked portion of the data structure to allow access to the portion by other processes.

9. A machine-implemented method for releasing a fine-grain locked portion of a data structure, the method comprising:
determining, by a processor, whether an access to a portion of a data structure stored in memory has occurred if the portion is locked, wherein the portion of the data structure includes event tracking data and one or more respective time stamps of the event tracking data, and the event tracking data tracks an activity associated with a source of the event tracking data, wherein the event tracking data includes web site traffic data included in a Hypertext Transfer Protocol (HTTP) request associated with a web site, wherein the access to the portion of the data structure comprises incrementing a number of hits stored in the portion of the data structure;
releasing, by the processor, the portion of the data structure stored in the memory if the access has occurred; and
discarding, by the processor, received event tracking data associated with the access to the portion of the data structure if the portion of the data structure is locked.

10. The method of claim 9, further comprising:
releasing the portion of the data structure after a predetermined period of time has elapsed.

11. The method of claim 10, wherein the predetermined period of time comprises a first period of time for a read operation to the locked portion of the data structure.

12. The method of claim 11, wherein the predetermined period of time comprises a second period of time for a write operation to the locked portion of the data structure, the second period of time being a longer period of time than the first period of time.

13. The method of claim 9, wherein the access comprises a write operation to the portion of the data structure.

14. The method of claim 9, wherein the access comprises a read operation to the portion of the data structure.

15. A system for providing fine-grain locking of a data structure to prevent access to a portion of the data structure utilized for real-time analytics reporting, the system comprising:

a buffer module configured to queue and transmit event tracking data included in one or more event tracking data communications, wherein each event tracking data communication includes event tracking data for tracking an activity associated with a source of the event tracking data communication, and the event tracking data includes respective characteristics in a set of categories, wherein the event tracking data includes web site traffic data included in a Hypertext Transfer Protocol (HTTP) request associated with a web site;

a real-time analytics query engine configured to lock a respective portion of one or more aggregation tables update the one or more aggregation tables with the event tracking data based on a time stamp of the event tracking data, and discard the event tracking data if the respective portion of one or more aggregation tables is locked, wherein each aggregation table includes event tracking data organized by a subset of the categories, wherein updating the one or more aggregation tables comprises incrementing a number of hits stored in the respective portion of the one or more aggregation tables; and a real-time analytics data storage module configured to store the updated one or more aggregation tables from the real-time analytics query engine.

16. The system of claim 15, wherein the real-time analytics query engine is further configured to release the respective portion of the one or more aggregations tables after updating the one or more aggregation tables.

17. The system of claim 15, wherein at least a respective second portion of the one or more aggregation tables is not locked when the respective portion of the one or more aggregation tables is locked.

18. A machine-readable medium comprising instructions stored therein, which when executed by a machine, cause the machine to perform operations comprising:
determining whether a portion of a table data structure is available for updating with event tracking data based on a time stamp of the event tracking data, wherein the table data structure comprises a set of respective rows, and the event tracking data tracks an activity associated with a source of the event tracking data, wherein the event tracking data includes web site traffic data included in a Hypertext Transfer Protocol (HTTP) request associated with a web site;

discarding the event tracking data if the portion of the table data structure is locked;

locking the portion of the table data structure to prevent access by other processes to the portion if the portion of the table data structure is available, wherein the portion of the table data structure comprises a respective row in the table data structure;

updating the portion of the table data structure with the event tracking data, wherein updating the portion of the table data structure comprises incrementing a number of hits stored in the portion of the table data structure; and releasing the portion of the table data structure after updating the portion with the event tracking data.

* * * * *